United States Patent
Ji et al.

(10) Patent No.: US 11,923,545 B2
(45) Date of Patent: Mar. 5, 2024

(54) CROWN ETHERS AS ADDITIVES FOR SILICON-BASED LI-ION BATTERIES

(71) Applicant: Enevate Corporation, Irvine, CA (US)

(72) Inventors: Liwen Ji, Irvine, CA (US); Benjamin Park, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 17/464,435

(22) Filed: Sep. 1, 2021

(65) Prior Publication Data

US 2022/0393174 A1    Dec. 8, 2022

Related U.S. Application Data

(63) Continuation-in-part of application No. 16/749,329, filed on Jan. 22, 2020.

(51) Int. Cl.
| | | |
|---|---|---|
| H01M 4/62 | (2006.01) | |
| H01M 4/04 | (2006.01) | |
| H01M 4/13 | (2010.01) | |
| H01M 4/134 | (2010.01) | |
| H01M 4/38 | (2006.01) | |
| H01M 10/05 | (2010.01) | |
| H01M 10/0525 | (2010.01) | |
| H01M 10/42 | (2006.01) | |

(52) U.S. Cl.
CPC ........... *H01M 4/62* (2013.01); *H01M 4/0404* (2013.01); *H01M 4/134* (2013.01); *H01M 4/386* (2013.01); *H01M 10/0525* (2013.01); *H01M 10/4235* (2013.01)

(58) Field of Classification Search
None
See application file for complete search history.

(56) References Cited

U.S. PATENT DOCUMENTS 5,286,365 A * 2/1994 Shu ..................... G01N 27/3335
                                                    204/418
5,814,420 A * 9/1998 Chu ..................... H01M 4/0411
                                                    429/102

(Continued)

FOREIGN PATENT DOCUMENTS

| CN | 112331919 A | * 2/2021 | ........ H01M 10/0567 |
| JP | 2004296189 | * 10/2004 | ............ H01M 10/05 |
| WO | WO 2019105544 | * 6/2019 | ........ H01M 10/0567 |

OTHER PUBLICATIONS

Yarmolenko et al., Effect of dibenzo-18-crown-6 on the polymer electrolyte/lithium anode interface, Jun. 16, 2004, Russian Journal of Electrochemistry, vol. 41, pp. 646-650 (Year: 2004).*

(Continued)

*Primary Examiner* — Maria Laios
*Assistant Examiner* — Angela J Martin
(74) *Attorney, Agent, or Firm* — McAndrews, Held & Malloy, Ltd.

(57) ABSTRACT

Additives for energy storage devices comprising crown ethers are disclosed. The energy storage device comprises a first electrode and a second electrode, where at least one of the first electrode and the second electrode is a Si-based electrode, a separator between the first electrode and the second electrode, and an electrolyte composition. Crown ether compounds may serve as additives to the first electrode and/or the second electrode, as well as the separator.

6 Claims, 12 Drawing Sheets

(56) References Cited

U.S. PATENT DOCUMENTS

| | | | | |
|---|---|---|---|---|
| 5,824,434 | A * | 10/1998 | Kawakami | H01M 4/24 429/214 |
| 5,897,758 | A * | 4/1999 | Musacchio | G01N 27/333 257/253 |
| 6,235,427 | B1 * | 5/2001 | Idota | H01M 4/58 429/223 |
| 6,689,513 | B1 * | 2/2004 | Morigaki | H01M 10/0565 429/231.95 |
| 10,707,478 | B2 * | 7/2020 | Park | C01B 33/021 |
| 11,342,553 | B2 * | 5/2022 | Teng | H01M 10/0585 |
| 2002/0086206 | A1 * | 7/2002 | Fauteux | H01M 10/0585 429/215 |
| 2005/0175903 | A1 * | 8/2005 | Kim | H01M 4/622 429/339 |
| 2008/0200717 | A1 * | 8/2008 | Kiser | C07C 253/30 558/423 |
| 2013/0230770 | A1 * | 9/2013 | Oya | H01M 4/485 429/188 |
| 2014/0170482 | A1 * | 6/2014 | Park | H01M 4/13 156/60 |
| 2015/0125745 | A1 * | 5/2015 | Kaneda | H01M 4/139 427/58 |
| 2015/0364795 | A1 * | 12/2015 | Stefan | H01M 10/0568 429/188 |
| 2019/0020034 | A1 * | 1/2019 | Umetsu | H01M 4/485 |
| 2021/0226251 | A1 * | 7/2021 | Ji | H01M 10/0569 |

OTHER PUBLICATIONS

F. Hu et al., Application of Functionalized Ether in Lithium Ion Batteries, RSC Advances, 2017, vol. 7, pp. 54203-54212.

F. Sagane et al., The Effect of the Cyclic Ether Additives to the Ethereal Electrolyte Solutions for Mg Secondary Battery, Electrochemistry, 2016, vol. 84(2), pp. 76-78.

B. Ziv et al., Manganese Sequestration and Li-Ion Batteries Durability Enhancement by Polymeric 18-Crown-6 Ethers, Journal of the Electrochemical Society, 2014, vol. 161(9), pp. A1213-A1217.

W. Xu et al., Crown Ethers in Nonaqueous Electrolytes for Lithium/Air Batteries, Electrochemical and Solid State Letters, 2010, vol. 13(4), pp. A48-A51.

A.A. Ignatova et al., Influence of 15-Crown-5 Additive to a Liquid Electrolyte on the Performance of Li/CFx—Systems at Temperatures up to -50°C., Journal of Power Sources, 2016, vol. 39, pp. 116-121.

M. Shimizu et al., Communication—Intercalation/De-Intercalation Behavior of Li-Ion Encapsulated by 12-Crown-4-Ether into Graphite Electrode, Journal of the Electrochemical Society, 2018, vol. 165(13), pp. A3212-A3214.

F. Sagane et al., The Effect of Cyclic Ethers on Mg Plating/Stripping Reaction in Ionic Liquid Electrolytes, Journal of the Electrochemical Society, 2019, vol. 166(3), pp. A5054-A5058.

* cited by examiner

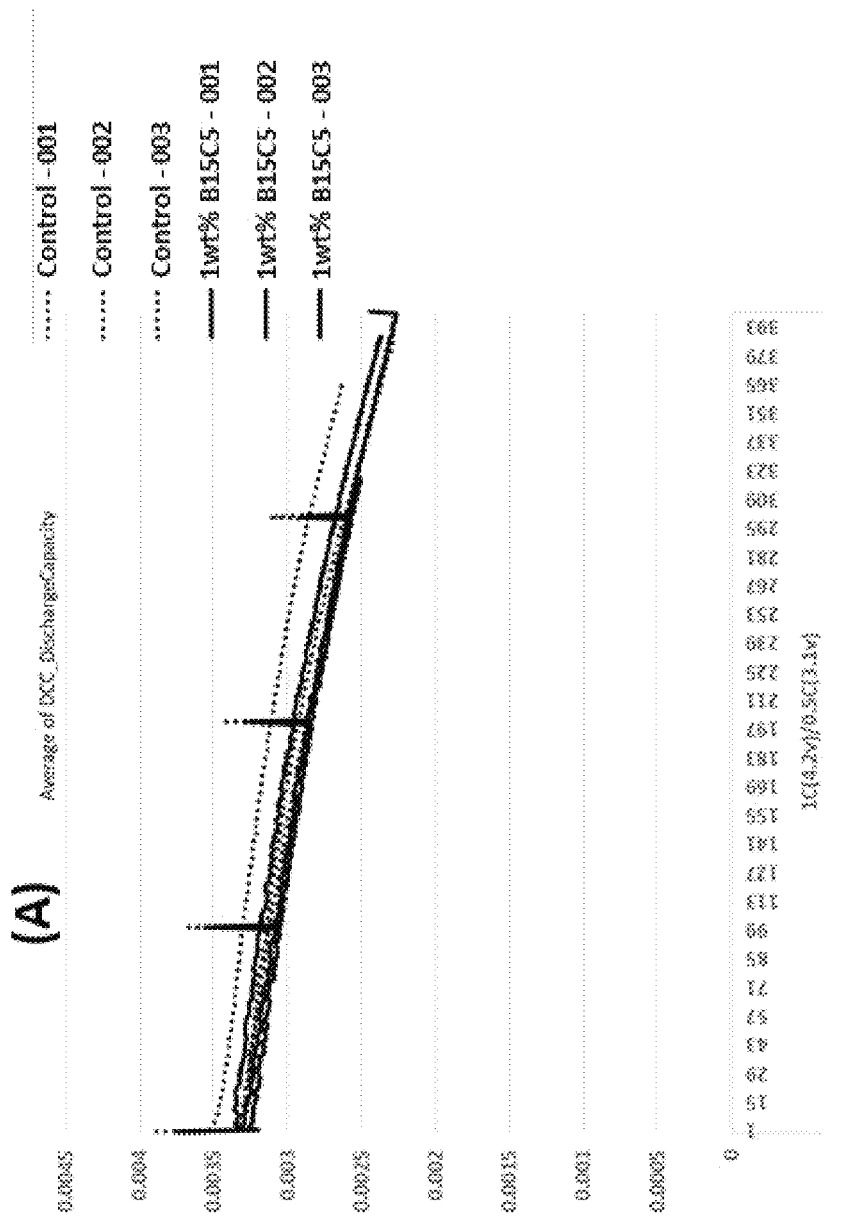

CROWN ETHERS AS ADDITIVES FOR SILICON-BASED LI-ION BATTERIES

CROSS-REFERENCE TO RELATED APPLICATIONS/INCORPORATION BY REFERENCE

This application is a continuation-in-part of and claims the benefit of U.S. application Ser. No. 16/749,329 filed on Jan. 22, 2020.

FIELD

Aspects of the present disclosure relate to energy generation and storage. More specifically, certain embodiments of the disclosure relate to additives for use in lithium-ion energy storage devices with silicon-based anode materials.

BACKGROUND

Conventional approaches for battery electrodes may be costly, cumbersome, and/or inefficient—e.g., they may be complex and/or time-consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using crown ether compounds in lithium-ion energy storage devices with silicon-based electrode materials, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 5A and 5B show the Capacity retention (FIG. 5A) and Normalized capacity retention (FIG. 5B) of Si-dominant anode//NCM811 cathode coin full cells. The cathode used may be: (dotted line)—NCM811 Control, (solid line)—1 wt % benzo-15-crown-5 (B115C5)-containing NCM811, in accordance with an example embodiment of the disclosure.

DETAILED DESCRIPTION

Figure 1:
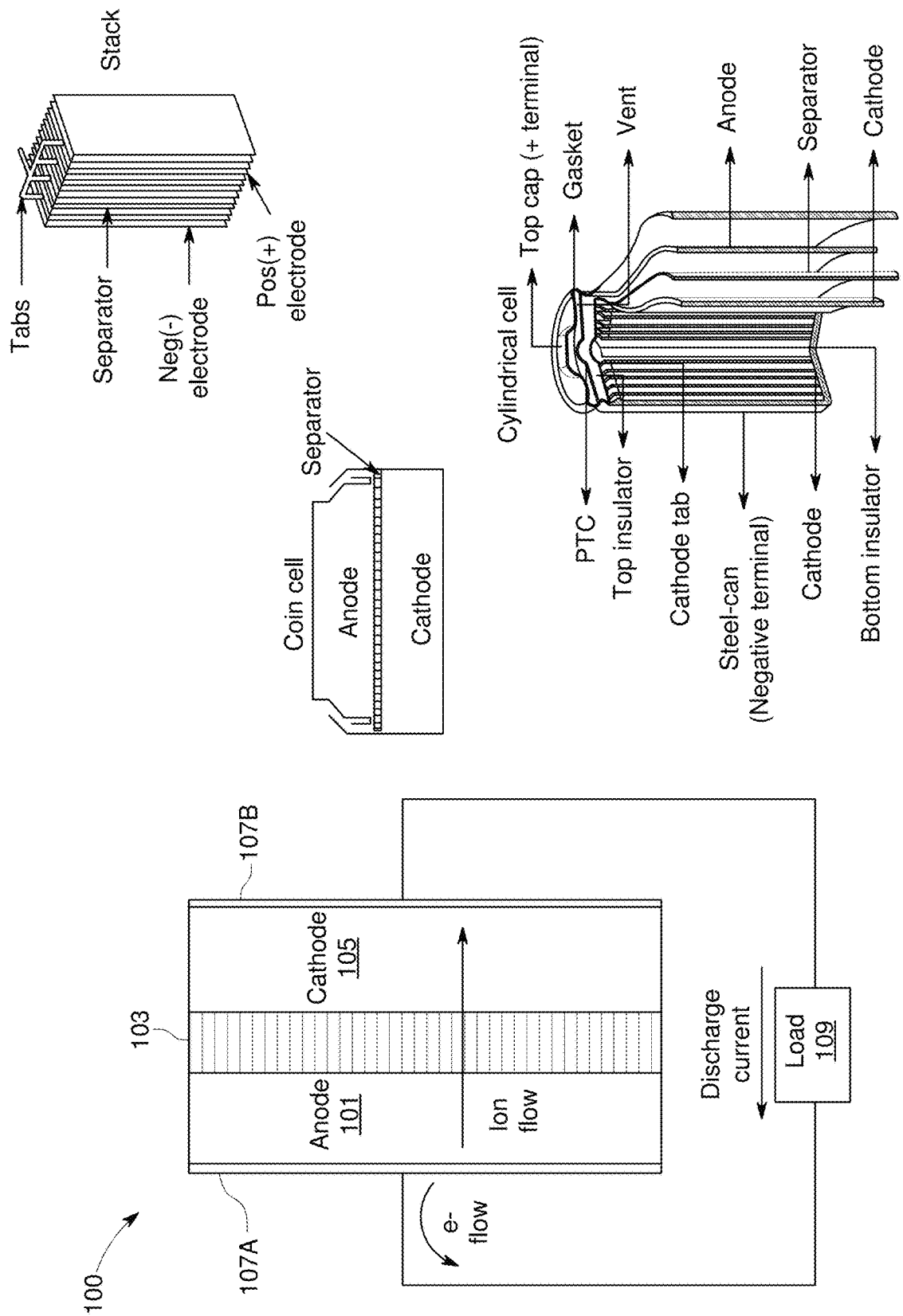
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium-ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high-performance electrochemical energy storage. Small-scale (<100 Wh) to large-scale (>10 KWh) devices primarily use lithium-ion (Li-ion) batteries over other rechargeable battery chemistries due to their high performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator, and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, LiPFe, and $LiClO_4$ etc. In an example scenario, the electrolyte may comprise Lithium hexafluorophosphate (LiPFe) and lithium bis(trifluoromethanesulfonyl)imide (LiTFSI) that may be used together in a variety of electrolyte solvents. Lithium hexafluorophosphate (LiPFe) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more of ethylene carbonate (EC), fluoroethylene carbonate (FEC), and/or ethyl methyl carbonate (EMC) in various percentages. In some embodiments, the electrolyte solvents may comprise one or more of EC from about 0-40%, FEC from about 2-40%, and/or EMC from about 50-70%

The separator 103 may be wet or soaked with a liquid or gel electrolyte. In addition, in an example embodiment, the separator 103 does not melt below about 100 to 120° C. and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through gelling or other processes even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for the transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliampere hours per gram. Graphite, the active material used in most lithium-ion battery anodes, has a theoretical energy density of 372 milliampere hours per gram (mAh/g). In comparison, silicon has a high theoretical capacity of 4200 mAh/g. To increase the volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for the separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through load 109 to the negative current collector 107A. The separator 103 blocks the flow of electrons inside the battery 100, allows the flow of lithium ions, and prevents direct contact between the electrodes.

While battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes and high-capacity anodes.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (for example, SuperP), vapor-grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge. These contact points facilitate the electrical contact between anode material and current collector to mitigate the isolation (island formation) of the electrode material while also improving conductivity in between silicon regions.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, silicon-based anodes have a low lithiation/dilithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and dilithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life. Therefore, silicon anodes require a strong conductive matrix that (a) holds silicon particles in the anode, (b) is flexible enough to accommodate the large volume expansion and contraction of silicon, and (c) allows fast conduction of electrons within the matrix.

Therefore, there is a trade-off among the functions of active materials, conductive additives, and polymer binders. The balance may be adversely impacted by high energy density silicon anodes with low conductivity and huge volume variations described above. Polymer binder(s) may be pyrolyzed to create a pyrolytic carbon matrix with embedded silicon particles. In addition, the polymers may be selected from polymers that are completely or partially soluble in water or other environmentally benign solvents or mixtures and combinations thereof. Polymer suspensions of materials that are non-soluble in water could also be utilized.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and/or high-voltage cathodes and anodes.

A lithium-ion battery typically includes a separator and/or electrolyte between an anode and a cathode. In one class of batteries, the separator, cathode, and anode materials are individually formed into sheets or films. Sheets of the cathode, separator, and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

Si is one of the most promising anode materials for Li-ion batteries due to its high specific gravimetric and volumetric capacity (discussed above), and low lithiation potential (<0.4 V vs. Li/Li$^+$). Cathode materials may include Lithium Nickel Cobalt Manganese Oxide (NMC (NCM): LiNi$_x$Co$_y$Mn$_z$O$_2$, x+y+z=1); Lithium Iron Phosphate (LFP: LiFePO$_4$/C); Lithium Nickel Manganese Spinel (LNMO: LiNi$_{0.5}$Mn$_{1.5}$O$_4$); Lithium Nickel Cobalt Aluminium Oxide (NCA: LiNi$_a$Co$_b$Al$_c$O$_2$, a+b+c=1); Lithium Manganese Oxide (LMO: LiMn$_2$O$_4$); and Lithium Cobalt Oxide (LCO: LiCoO$_2$).

Among the various cathodes presently available, layered lithium transition-metal oxides such as Ni-rich LiNi$_x$Co$_y$Mn$_z$O$_2$ (NCM, 0≤x, y, z<1) or LiNi$_x$Co$_y$Al$_z$O$_2$ (NCA, 0≤x, y, z<1) are promising ones due to their high theoretical capacity (~280 mAh/g) and relatively high average operating potential (3.6 V vs Li/Li$^+$). In addition to Ni-rich NCM or NCA cathode, LiCoO$_2$ (LCO) is also a very attractive cathode material because of its relatively high theoretical specific capacity of 274 mAh g$^{-1}$, high theoretical volumetric capacity of 1363 mAh cm$^{-3}$, low self-discharge, high discharge voltage, and good cycling performance. Coupling Si anodes with high-voltage Ni-rich NCM (or NCA) or LCO cathodes can deliver more energy than conventional Li-ion batteries with graphite-based anodes, due to the high capacity of these new electrodes. However, both Si-based anodes and high-voltage Ni-rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (e.g., >300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes and leads to an endless exposure of Si particle surfaces to the liquid electrolyte. Because of the generally inferior cycle life of Si compared to graphite, only a small amount of Si or Si alloy is used in conventional anode materials.

The cathode (e.g., NCM (or NCA) or LCO) usually suffers from inferior stability and a low capacity retention at a high cut-off potential. The reasons can be ascribed to the unstable surface layer's gradual exfoliation, continuous electrolyte decomposition, and the transition metal ion dissolution into electrolyte solution; further causes for inferior performance can be: (i) structural changes from layered to spinel upon cycling; (ii) Mn- and Ni-dissolution giving rise to surface side reactions at the graphite anode; and (iii) oxidative instability of carbonate-based electrolytes at high voltage. The major limitations for LCO cathodes are high cost, low thermal stability, and fast capacity fade at high current rates or during deep cycling. LCO cathodes are expensive because of the high cost of Co. Low thermal stability refers to an exothermic release of oxygen when a lithium metal oxide cathode is heated. In order to make good use of Si anode//NCM or NCA cathode, and Si anode//LCO cathode-based Li-ion battery systems, the aforementioned barriers need to be overcome.

As discussed above, Li-ion batteries are being intensively pursued in the electric vehicle markets and stationary energy storage devices. To further improve the cell energy density, high-voltage layered transition metal oxide cathodes, examples including Ni-rich (e.g. NCA, NCM), Li-rich cathodes, and high capacity and low-voltage anodes, such as Si, Ge, etc may be utilized. However, the performance deterioration of full cells, in which these oxides are paired with Si or other high capacity anodes, increases markedly at potentials exceeding 4.30 V, limiting their wider use as high-energy cathode materials. Although a higher Ni content provides a higher specific capacity for Ni-rich NCM or NCA cathodes, it involves surface instability because of the unstable Ni$^{4+}$ increase during the charging process. As it is favorable to convert the unstable Ni$^{4+}$ into the more stable Ni$^{3+}$ or Ni$^{2+}$, Ni$^{4+}$ triggers severe electrolyte decomposition at the electrode/electrolyte interface, leading to the reduction of Ni$^{4+}$ and the oxidative decomposition of the electrolytes. Electrolyte decomposition at the electrolyte/electrode interface causes the accumulation of decomposed adducts on the NCM cathode surface. This hinders Li+ migration between the electrolyte and electrode, which in turn results in the rapid fading of the cycling performance. Thus the practical integration of a silicon anode in Li-ion batteries faces challenges such as large volume changes, unstable solid-electrolyte interphase, electrolyte drying out, etc.

Attempts for improving the cathode surface properties, such as through-surface coating and surface doping may effectively mitigate electrolyte decomposition at the interface, and have been attempted. Most of these attempts are based on the cathode-electrolyte interface (CEI) concept, which does not permit electron-transfer reactions, but allows Li+ migration between the electrode and electrolyte. However, without negative impacts on the anode, electrolyte, and battery manufacturing procedures or design, adding a cathode additive may be an efficient, cost-effective and practically feasible strategy to overcome the barriers of layered cathode materials and improve the full cell performance.

One strategy for overcoming these barriers includes exploring new electrode additives in order to make good use of Si anode//NCM or NCA cathode-, and Si anode//LCO cathode-based full cells. On the cathode side, the ideal additives should be oxidized preferentially to the solvent molecule in the bare electrolyte, resulting in a protective cathode electrolyte interphase (CEI) film formed on the surface of the Ni-rich NCM (or NCA) and LCO cathodes. At the same time, it should help alleviate the dissolution phenomenon of transition metal ions and decrease surface resistance on the cathode side.

Thus incorporation of functional additives in electrodes may help modify the surface chemistry, circumvent the massive volume change and initial capacity loss due to the continuous electrolyte decomposition in high capacity and reactive electrodes, such as Si anodes, and/or Ni-rich NCA or NCM cathodes. A further strategy for improving battery properties is to modify the separator, which can, e.g., improve cycle performance.

In the present disclosure, crown ether compounds are described for use as additives for electrodes. Also described in the present disclosure, is the use of crown ether compounds to modify the separator to prepare different types of functional separators to improve the cycle performance of Li-ion batteries or Li-metal batteries. In one embodiment, the compounds are used as cathode additives for Si-dominant anodes//NCA or NCM cathode full cells.

Crown ethers are compounds with at least three or more oxygen atoms incorporated in a monocyclic carbon backbone. The oxygen atoms are well situated to coordinate with a cation located at the interior of the ring, whereas the exterior of the ring is hydrophobic. A typical characteristic of crown ethers is the way in which they interact with various ionic species via ether oxygen atoms. They exhibit strong affinity and high selectivity for alkali and alkaline earth metal ions, transition metal ions, lanthanide ions, etc. because of the hydrophilic cavity consisting of heteroatoms, demarcated by a lipophilic envelope of ethylene units. As a result, a complex structure can be formed where the metal ion can be trapped in a cavity created by the cyclic ether. The interactions between these ligands and metal cations are generally non-covalent in nature. The selectivity behavior of crown ethers for metal cations has often been explained based on a size-fit concept, i.e. a more stable complex is formed when the cation size matches the size of the crown ether cavity.

Crown ethers have found applications in many areas based on their ability to selectively recognize cations of different ionic sizes. Crown ethers may help improve the cell cycling and rate performance by trapping Mn ion or other transition metal ions and decreasing their solubilities from the cathode side. In particular, the high solvent-coordinating ability can help increase the ionic conductivity and lithium transference number, stabilize the solvent and suppress the formation of thick SEI layers that hinder interfacial Li-ion transport.

There are two important points in controlling the SEI production; one is the timing of the SEI formation (additive decomposition) and the other is the morphology of the SEI (thickness, Li-ion conductivity, and components). Crown ether compounds have a reduction potential which enables the formation of a characteristic SEI with dense and low impedance. Battery performance is significantly influenced by the SEI thickness and components, which are solely determined by the structure of the additives. The reactivity of additives assists with modification of the SEI layer composition and improves the SEI stability on the surface of Si anodes, which permits effective surface passivation of the anode, increase SEI robustness and structural stability of the silicon anodes.

Cathode materials are also still facing some fundamental challenges, such as irreversible phase transition from hexagonal through cubic to rock salt structure, mechanical cracking of the secondary particle structure, electrolyte depletion that is often accompanied by impedance increase and volumetric swelling of the batteries, as well as gelation of cathode slurry in the slurry-making process.

Among the various Li-ion battery cathode materials, Ni-rich layered lithium transition metal oxides are promising cathode materials for the next generation high energy density lithium-ion batteries due to their relatively modest volume change, high specific capacity, and good thermal stability. However, high Ni content leads to severe side reactions at the cathode/electrolyte interface, coupled with mechanical disintegration significantly degrading the electrochemical performance and safety. Several strategies have been explored to overcome these issues, such as cation doping for stabilizing the cathode material's lattice structure, surface coating for protecting cathode particles from parasitic reactions with the electrolyte components, and synthesizing concentration-gradient or core-shell structures with high Ni content core for stabilizing the material's surface chemistry.

Without negative impacts on the anode, electrolyte, and the battery manufacturing procedures or design, adding a cathode additive as described herein may be an efficient, cost-effective and practically feasible strategy to overcome the barriers of layered cathode materials and improve the full cell performance. In one embodiment, this may be achieved by placing a coating onto cathode active material powders so that the cathode powders could be a drop-in replacement in the electrode.

In some embodiments, the crown ether compounds disclosed herein may be used in silicon-dominant silicon-carbon composite anode active materials where the crown ether compounds comprise a coating on the active materials. In one embodiment, the coated active materials may be used in combination with anodes containing >50% silicon in the active material and heat-treated to above 300 degrees Celsius. In another embodiment, the coated active materials may be used in combination with anodes containing >25% silicon in the active material and heat-treated to above 300 degrees Celsius. In a further embodiment, the coated active materials may be used in combination with anodes containing >50% silicon in the active material and heat-treated to above 400 degrees Celsius. For these silicon-dominant silicon-carbon composite anode active materials where the crown ether compounds comprise a coating on the active materials, the coating is created through pyrolysis of carbon and the coating may have better coverage than traditional polymer binders.

To overcome the current obstacles associated with developing high-energy full-cells with Si-based anodes, the next generation of electrode additives are described herein. These additives may help modify cathode surfaces, forming stable CEI layers, or may form a stable, electronically insulating but ionically conducting SEI layer on the surface of Si anodes. These additives may increase the electrochemical stability of Li-ion batteries when cycled at higher voltages and help with calendar life of the batteries. Further, the additives may produce one or more of the following benefits: increased cycle life, increased energy density, increased safety, increased thermal stability of the electrolyte, enhanced high-temperature performance of the cells, decreased electrolyte consumption, and/or decreased gassing.

The solid-electrolyte interphase (SEI) formed through the reductive decomposition of solvent molecules plays a crucial role in the performances of Si anode-based Li-ion batteries. It can help prevent further electrolyte decomposition, thereby underlying capacity retention. The SEI also represents an electronically insulating barrier between the electrodes and electrolyte, with its composition, thickness, and structure influencing the lithium transport across the interphase. On the cathode side, the additives should be oxidized preferentially to the solvent molecule in the bare electrolyte, resulting in a protective cathode electrolyte interphase (CEI) film formed on the surface of the cathode. At the same time, the additive may help alleviate the dissolution phenomenon of transition metal ions and decrease surface resistance on the cathode side.

In the present disclosure, the use of crown ether compounds as electrode additives for energy storage devices is described. Due to their unique chemical structures and functional groups, using crown ether compounds as electrode additives may bring the following benefits: (i) stabilize solid/electrolyte interface film to reduce electrolyte reactions (oxidation on the NCM, NCA, or LCO cathode and reduction on the Si anode), prevent Si anode volume expansion, and protect transition metal ion dissolution from NCM or NCA cathode and stabilize the subsequent structure changes; and avoid the exothermic reaction between the released oxygen from cathodes and an organic electrolyte and enhance the thermal stability of cathodes. Due to their versatility in reaction chemistry and overall stability in electrochemical environments, using crown ether compounds as additives into electrode compositions may help improve both overall electrochemical performance and safety of Si anode-based Li-ion batteries. In another embodiment, improving battery properties by modifying the separator with crown ether compounds, is disclosed herein. This may improve properties such as cycle performance.

When used as additives, crown ether compounds may be able to produce a characteristic SEI with dense and low impedance, which can effectively suppress the decomposition of electrolyte, HF generation, and LiF formation upon cycling. At the same time, the compounds may be more stable on the positive electrode and they are not liable to be oxidatively decomposed when the battery works under severe conditions such as higher temperature or higher working voltage. Performance of cells may depend on the nature of the crown ether compound (e.g. chemical structure) where factors such as steric similarities/differences, nature and position of potential electron-withdrawing groups, and the number and nature of heteroatoms within the molecule can have a strong effect. In the present disclosure, the use of crown ether compounds as electrode additives for Si anode-based Li-ion batteries is described.

In the present disclosure, a simple process is described of using crown ether compounds as electrode additives by directly adding them into an electrode slurry to prepare these additive-containing electrodes for Li-ion batteries. The crown ethers may also be used to modify separators to prepare different types of functional separators for Li-ion batteries or Li-metal batteries.

Specifically considering the cathode, without negative impacts on the anode, electrolyte, and the battery manufacture procedures or design, adding cathode additives may be another efficient, cost-effective, and practically feasible strategy to overcome the barriers of layered cathode materials and to finally improve the full cell performance. In the present disclosure a simple process is described to prepare these additive-containing cathodes where crown ether compounds may be added into a normal cathode-coating slurry, or may be added by dipping the prepared cathodes into their solutions; they can thus be loaded inside the cathodes or on the surface of the cathodes. These additives may help improve structural stability and enhance the ionic conductivity of the cathode materials due to their weaker interactions.

As discussed above, typical electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce self-supported electrodes. The need for a metal foil current collector is eliminated or minimized because the conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

In order to increase the volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell over 300% upon lithium insertion. Because of this expansion, anodes including silicon should be allowed to expand while maintaining electrical contact between the silicon particles.

Cathode electrodes (positive electrodes) described herein may include metal oxide cathode materials, such as Lithium Cobalt Oxide ($LiCoO_2$) (LCO), Ni-rich oxides, high voltage cathode materials, lithium-rich oxides, nickel-rich layered oxides, lithium-rich layered oxides, high-voltage spinel oxides, and high-voltage polyanionic compounds. Ni-rich oxides and/or high voltage cathode materials may include NCM and NCA. Example of NCM materials include, but are not limited to, $LiNi_{0.6}Co_{0.2}Mn_{0.2}O_2$ (NCM-622) and $LiNi_{0.8}Co_{0.1}Mn_{0.1}O_2$ (NCM-811). Lithium-rich oxides may include $xLi_2Mn_3O_2.(1-x)LiNi_aCo_bMn_cO_2$. Nickel-rich layered oxides may include $LiNi_{1+x}M_{1-x}O_z$ (where M=Co, Mn or Al). Lithium-rich layered oxides may include $LiNi_{1+x}M_{1-x}O_2$ (where M=Co, Mn or Ni). High-voltage spinel oxides may include $LiNi_{0.5}Mn_{1.5}O_4$. High-voltage polyanionic compounds may include phosphates, sulfates, silicates, etc.

In certain embodiments, the positive electrode may be one of NCA, NCM, LMO or LCO. The NCM cathodes include NCM 9 0.5 0.5, NCM811, NCM622, NCM532, NCM433, NCM111, and others. In further embodiments, the positive electrode comprises a lithium-rich layered oxide $xLi_2MnO_3$. $(1-x)LiNi_aCo_bMn_cO_2$; nickel-rich layered oxide $LiNi_{1-x}M_xO_2$ (M=Co, Mn and Al); or lithium-rich layered oxide $LiNi_{1+x}M_{1-x}O_2$ (M=Co, Mn and Ni) cathode. In some embodiments, crown ether compounds may be used as electrode additives for Si-dominant anode//$LiCoO_2$ (LCO), $LiNi_xCo_yMn_zO_2$ (NCM, 0≤x, y, z<1) or $LiNi_xCo_yAl_zO_2$ (NCA, 0≤x, y, z<1) cathode full cells.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, the largest dimension of the silicon particles can be less than about 40 μm, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight; greater than 0% and less than about 95% by weight; or between about 50% and about 95% by weight. Additional embodiments of the amount of silicon in the composite material include more than about 50% by weight, between about 30% and about 95% by weight, between about 50% and about 85% by weight, and between about 75% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

The composite material can be formed by pyrolyzing a polymer precursor, such as polyamide acid. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating over 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In some embodiments, there may be greater than 0% and less than about 90% by weight of one or more types of carbon phases. In certain embodiments, the carbon phase is substantially amorphous. In other embodiments, the carbon phase is substantially crystalline. In further embodiments, the carbon phase includes amorphous and crystalline carbon. The carbon phase can be a matrix phase in the composite material. The carbon can also be embedded in the pores of the additives including silicon. The carbon may react with some of the additives to create some materials at interfaces. For example, there may be a silicon carbide layer between the silicon particles and the carbon.

In certain embodiments, graphite particles are added to the mixture. Advantageously, graphite can be an electrochemically active material in the battery as well as an elastically deformable material that can respond to the volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during the use of the battery in order to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although the maximum gravimetric capacity of the composite material may not be utilized, using the composite material at a lower capacity can still achieve a higher capacity than certain lithium-ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 60% of the composite material's maximum gravimetric capacity or below about 50% of the composite material's maximum gravimetric capacity.

An electrolyte composition for a lithium-ion battery can include a solvent and a lithium-ion source, such as a lithium-containing salt. As described herein, a lithium-ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively. Electrolytes and/or electrolyte compositions may be a liquid, solid, or gel.

In some embodiments, the solvents in the electrolyte composition include, but are not limited to, one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC). In further embodiments, the solvents include at least one of one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, along with at least one or more of fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC).

The term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12 2-3, 2-4, 2-5, 2-6, 3-4, 3-5, 3-6, 4-5, 4-6 and 5-6. The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —$(CH_2)_n$—, where n is 1, 2, 3, 4, 5, 6, 7, 8, 9, or 10. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene, and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

As used herein, the term "bridged polycyclic" refers to compounds wherein the cycloalkyl contains a linkage of one or more atoms connecting non-adjacent atoms. The following structures

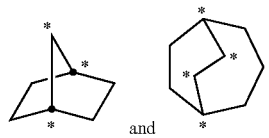

are examples of "bridged" rings. As used herein, the term "spiro" refers to two rings that have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbornanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di-, or tri-substituted by one, two or three radicals. Preferred as aryl is naphthyl, phenyl, or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom such as N, O, or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

In accordance with the disclosure, various functional crown ethers may be used as one or more of electrode additives (cathode or anode) and/or as separator modifiers.

Examples of crown ether compounds include, but are not limited to, 12-crown-4 ethers; 13-crown-4 ethers; 14-crown-4 ethers; 15-crown-5 ethers; 16-crown-5 ethers; 17-crown-5 ethers; 20-crown-6 ethers; 18-crown-6 ethers; 21-crown-7 ethers; 24-crown-8 ethers; 27-crown-9 ethers; 30-crown-10 ethers; and their derivatives. The crown ether compounds may also contain other functional groups such as alkenyl; heteroalkenyl; alkynyl; heteroalkynyl; alkyl optionally substituted by —F, —CN, —CF$_3$ or heterocycloalkyl; cycloalkyl; heterocycloalkyl; or combinations thereof. The crown ether compounds may also contain heterogeneous atoms in the structure, such as sulfur, oxygen, Si, P, or others.

In one embodiment, the crown ether compounds may be functionalized or unfunctionalized 12-crown-4 ethers, 13-crown-4 ethers, 14-crown-4 ethers or their derivatives. These 12-crown-4 ethers, 13-crown-4 ethers, 14-crown-4 ethers or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 12-crown-4; Benzo-12-crown-4; Dibenzo-12-crown-4; 13-crown-4; 14-crown-4, etc.

In one embodiment, the crown ether compounds may be functionalized or unfunctionalized 15-crown-5 ethers or their derivatives. These 15-crown-5 ethers or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 15-crown-5; benzo-15-crown-5; Dibenzo-15-crown-5; 2,3-Naphtho-15-crown-5; 3-Ethenyl-2,5,8,11,14-pentaoxabicyclo[13.4.0]nonadeca-1(19),15,17-triene, etc.

In one embodiment, the crown ether compounds may be functionalized or unfunctionalized 16-crown-5 ethers, 17-crown-5 ethers, 20-crown-6 ethers or their derivatives. These 16-crown-5 ethers, 17-crown-5 ethers, 20-crown-6 ethers or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 16-crown-5; Benzo-16-crown-5; Dibenzo-16-crown-5; 17-crown-5; 20-crown-6, etc.

In one embodiment, the crown ether compounds may be functionalized or unfunctionalized 18-crown-6 ethers or their derivatives. These 18-crown-6 ethers or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 18-crown-6; Diaza-18-crown-6; 2,5,8,11,14,17-Hexaoxabicyclo[16.4.0]docosane; 4'-Methylbenzo-18-crown-6; 4'-tert-Butylbenzo-18-crown-6; 4'-Aminobenzo-18-crown-6; 4-Vinylbenzo-18-crown-6; 20-Ethynyl-2,5,8,11,14,17-hexaoxabicyclo[16.4.0]docosa-1(18),19,21-triene; 2,5,8,11,14,17-Hexaoxabicyclo[16.4.0]

docosa-1 (22),18,20-triene-3,3-dicarbonitrile; 1-(2,5,8,11, 14,17-hexaoxabicyclo[16.4.0]docosa-1 (18),19,21-trien-20-yl)piperidine; 3-Ethenyl-2,5,8,11,14,17-hexaoxabicyclo [16.4.0]docosa-1 (22),18,20-triene; 2,5,8,11,14-Pentaoxa-17-azabicyclo[16.4.0]docosa-1 (22),18,20-triene; 3-Tert-Butyl-2,5,8,11,14,17-Hexaoxabicyclo[16.4.0]Docosa-1 (22),18,20-Triene; 4-Methyl-2,5,8,11,14,17-Hexaoxabicyclo[16.4.0]Docosa-1 (22),18,20-Triene; 6-propyl-2,5,8,11, 14,17-hexaoxabicyclo[16.4.0]docosa-1 (22),18,20-triene; 7-methyl-2,5,8,11,14,17-hexaoxabicyclo[16.4.0]docosa-1 (22),18,20-triene; 3-Methyl-2,5,8,11,14,17-hexaoxabicyclo [16.4.0]docosa-1 (22),18,20-triene; 3-(2,5,8,11,14,17-Hexaoxabicyclo[16.4.0]docosa-1 (22),18,20-trien-3-yl)-2,5, 8,11,14,17-hexaoxabicyclo[16.4.0]docosa-1 (22),18,20-triene; Dibenzo-18-crown-6; Di-tert butyl benzo 18-crown-6; 4,17-Dimethyl-2,3,11,12-dibenzo-1,4,7,10,13,16-hexaoxacyclooctadeca-2,11-diene; 2,4-Dibenzo-18-crown-6; Dicyclohexyl 18-crown-6; 2,3-Benzo-11,12-cyclohexano-1,4,7,10,13,16-hexaoxacyclooctadecane; (1S, 9R,14R,22S)-2,5,8,15,18,21-Hexaoxatricyclo[20.4.0.09,14] hexacosane; 4,4' (5')di-t-butyl-cyclohexano-18-crown-6, etc.

In one embodiment, the crown ether compounds may be functionalized or unfunctionalized 21-crown-7 ethers or their derivatives. These 21-crown-7 ethers or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 21-crown-7; Benzo-21-crown-7; Dibenzo-21-crown-7; Di-(tert butyl benzo)-21-crown-7; Dicyclohexano-21-crown-7, etc.

In one embodiment, the crown ether compounds may be functionalized or unfunctionalized 24-crown-8 ethers or their derivatives. These 24-crown-8 ethers or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 24-crown-8 ether; Benzo-24-crown-8 ether; benzyloxymethyl-24-crown-8; 4'-Vinyl-benzo-24-crown-8 ether; Dibenzo-24-crown-8; dinaphtho-24-crown-8; Dicyclohexano-24-crown-8, etc.

In one embodiment, the crown ether compounds may be functionalized or unfunctionalized 27-crown-9 ethers, or their derivatives. These 27-crown-9 ethers, or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 27-crown-9 ether; Benzo-27-crown-9 ether; 4'-Vinylbenzo-27-crown-9 ether, etc.

In one embodiment, the crown ether compounds may be functionalized or unfunctionalized 30-crown-10 ethers, or their derivatives. These 30-crown-10 ethers, or their derivatives may also contain other functional groups, as described herein. Some of these modifications may also include the use of alkyl substituents, aromatic sub-cyclic units, nitrogen, silicon, and/or sulfur atoms substituted for oxygen in the macrocyclic ring and other changes which provide crowns with unique complexing properties. These compounds include, but are not limited to 30-crown-10; Benzo-30-crown-10; 4'-Vinylbenzo-30-crown-10 ether; Dibenzo-30-crown-10; bis(m-phenylene)-32-crown-10, etc.

In some embodiments, the crown ether compound as described above may be a compound with one or more functional substituents (groups, moieties) in addition to the crown ether moiety. The compounds described herein may be further substituted with substituents selected from the group consisting of H, OH, F, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as defined above, which may be also further optionally substituted, such as alkyl optionally substituted by F, CN, $CF_3$; or a combination thereof. The compound may also contain other heterogeneous atoms in the structure, such as sulfur, oxygen, Si, P, or others.

Substituents may be one or more alkenyl, alkenylene, alkynyl, alkynylene, cycloalkyl, cycloalkylene, aryl, arylene or heteroaryl substituents, which are substituted by H, alkyl, fluoro-alkyl, alkylene, alkoxy, alkenyl, alkenylene, alkynyl, alkynylene, cycloalkyl, cycloalkylene, aryl, arylene, heteroaryl, heteroalkyl, heteroalkylene, heterocycloalkyl, and heterocycloalkylene, as described above, and which may be also further optionally substituted.

In some embodiments, the additives may be crown ether compounds with different functional groups. The functional groups can be —NH, —$NH_2$, alkenyl, heteroalkenyl, alkynyl, heteroalkynyl, alkyl optionally substituted by —F, —$CF_3$ or heterocycloalkyl, a cycloalkyl, a heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof.

In some embodiments, the crown ether compound may be selected from any of Benzo-18-crown-6-ether (B18C6); 18-crown-6; Diaza-18-crown-6; 2,5,8,11,14,17-Hexaoxabicyclo[16.4.0]docosane; 4'-Methylbenzo-18-crown-6; 4'-tert-Butylbenzo-18-crown-6; 4'-Aminobenzo-18-crown-6; 4-Vinylbenzo-18-crown-6; 20-Ethynyl-2,5,8,11,14,17-hexaoxabicyclo[16.4.0]docosa-1 (18),19,21-triene; 2,5,8,11, 14,17-Hexaoxabicyclo[16.4.0]docosa-1 (22),18,20-triene-3, 3-dicarbonitrile; 1-(2,5,8,11,14,17-hexaoxabicyclo[16.4.0] docosa-1 (18),19,21-trien-20-yl)piperidine; 3-Ethenyl-2,5,8, 11,14,17-hexaoxabicyclo[16.4.0]docosa-1 (22),18,20-triene; 2,5,8,11,14-Pentaoxa-17-azabicyclo[16.4.0]docosa-1 (22),18,20-triene; 3-Tert-Butyl-2,5,8,11,14,17-Hexaoxabicyclo[16.4.0]Docosa-1 (22),18,20-Triene; 4-Methyl-2,5,8, 11,14,17-Hexaoxabicyclo[16.4.0]Docosa-1 (22),18,20-Triene; 6-propyl-2,5,8,11,14,17-hexaoxabicyclo[16.4.0] docosa-1 (22),18,20-triene; 7-methyl-2,5,8,11,14,17-hexaoxabicyclo[16.4.0]docosa-1 (22),18,20-triene; 3-Methyl-2,5,8,11,14,17-hexaoxabicyclo[16.4.0]docosa-1 (22),18,20-triene; 3-(2,5,8,11,14,17-Hexaoxabicyclo [16.4.0]docosa-1 (22),18,20-trien-3-yl)-2,5,8,11,14,17-hexaoxabicyclo[16.4.0]docosa-1 (22),18,20-triene; Dibenzo-18-crown-6; Di-tert butyl benzo 18-crown-6; 4,17-Dimethyl-2,3,11,12-dibenzo-1,4,7,10,13,16-hexaoxacyclooctadeca-2,11-diene; 2,4-Dibenzo-18-crown-6; Dicyclohexyl 18-crown-6; 2,3-Benzo-11,12-cyclohexano-1,4,7,10, 13,16-hexaoxacyclooctadecane; (1S,9R,14R,22S)-2,5,8,15, 18,21-Hexaoxatricyclo[20.4.0.09,14]hexacosane; 4,4' (5') di-t-butyl-cyclohexano-18-crown-6; 12-crown-4; Benzo-12-crown-4; Dibenzo-12-crown-4; 13-crown-4; 14-crown-4; 15-crown-5; benzo-15-crown-5; Dibenzo-15-crown-5; 2,3-Naphtho-15-crown-5; 3-Ethenyl-2,5,8,11,14-pentaoxabicyclo[13.4.0]nonadeca-1(19),15,17-triene; 16-crown-5;

Benzo-16-crown-5; Dibenzo-16-crown-5; 17-crown-5; 20-crown-6; 21-crown-7; Benzo-21-crown-7; Dibenzo-21-crown-7; Di-(tert butyl benzo)-21-crown-7; Dicyclohexano-21-crown-7; 24-crown-8 ether; Benzo-24-crown-8 ether; benzyloxymethyl-24-crown-8; 4'-Vinylbenzo-24-crown-8 ether; Dibenzo-24-crown-8; dinaphtho-24-crown-8; Dicyclohexano-24-crown-8; 27-crown-9 ether; Benzo-27-crown-9 ether; 4'-Vinylbenzo-27-crown-9 ether; 30-crown-10; Benzo-30-crown-10; 4'-Vinylbenzo-30-crown-10 ether; Dibenzo-30-crown-10; and bis(m-phenylene)-32-crown-10, or combinations thereof.

Example structures of crown ether based compounds are shown below:

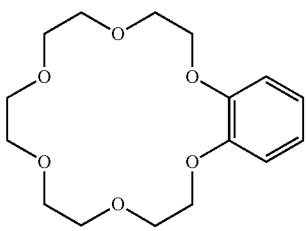

Benzo-18-crown-6-ether (B18C6)

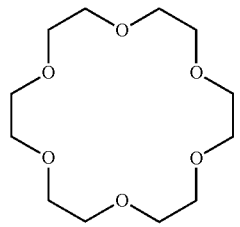

18-crown-6

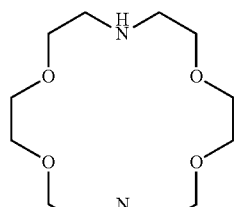

Diaza-18-crown-6

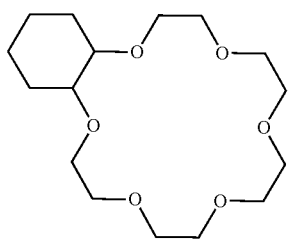

2,5,8,11,14,17-Hexaoxabicyclo[16.4.0]docosane

-continued

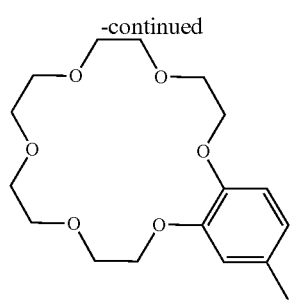

4'-Methylbenzo-18-crown-6

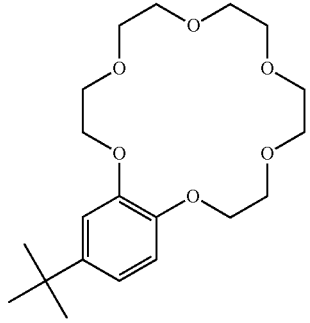

4'-tert-Butylbenzo-18-crown-6

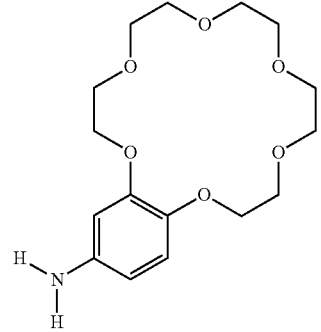

4'-Aminobenzo-18-crown-6

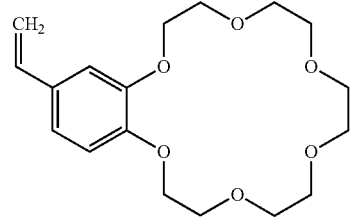

4-Vinylbenzo-18-crown-6

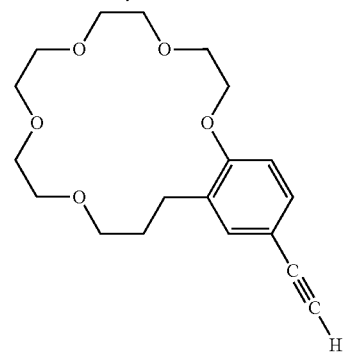

20-Ethynyl-2,5,8,11,14,17-hexaoxabicyclo[16.4.0]docosa-1(18),19,21-triene

-continued

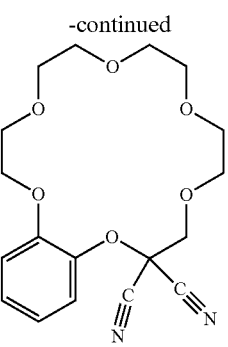

2,5,8,11,14,17-Hexaoxabicyclo[16.4.0]docosa-1(22),18,20-triene-3,3-dicarbonitrile

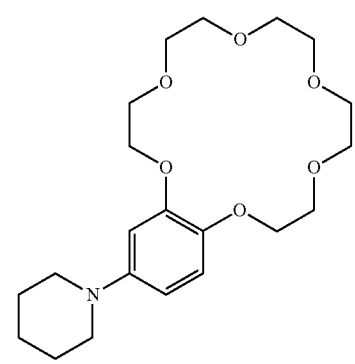

1-(2,5,8,11,14,17-hexaoxabicyclo[16.4.0]docosa-1(18),19,21-trien-20-yl)piperidine

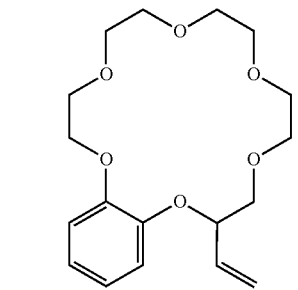

3-Ethenyl-2,5,8,11,14,17-hexaoxabicyclo[16.4.0]docosa-1(22),18,20-triene

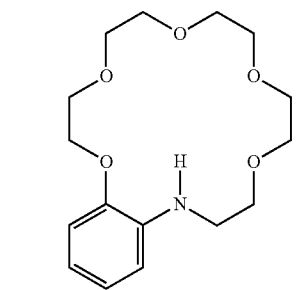

2,5,8,11,14-Pentaoxa-17-azabicyclo[16.4.0]docosa-1(22),18,20-triene

-continued

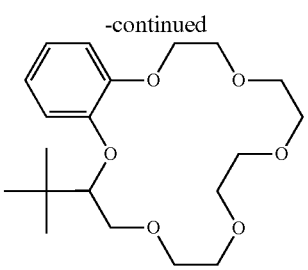

3-Tert-Butyl-2,5,8,11,14,17-Hexaoxbicyclo[16.4.0]Docosa-1-(22),18,20-Triene

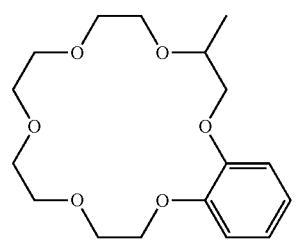

4-Methyl-2,5,8,11,14,17-Hexaoxbicyclo[16.4.0]Docosa-1-(22),18,20-Triene

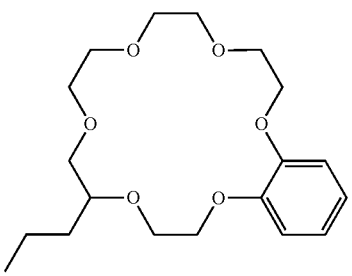

6-propyl-2,5,8,11,14,17-hexaoxabicyclo[16.4.0]docosa-1-(22),18,20-triene

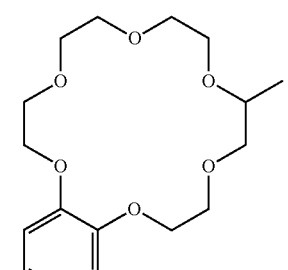

7-methyl-2,5,8,11,14,17-hexaoxabicyclo[16.4.0]docosa-1-(22),18,20-triene

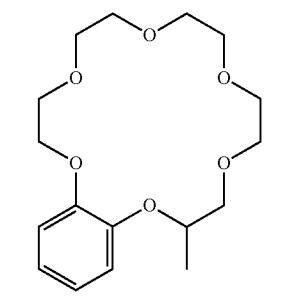

3-Methyl-2,5,8,11,14,17-hexaoxabicyclo[16.4.0]docosa-1-(22),18,20-triene

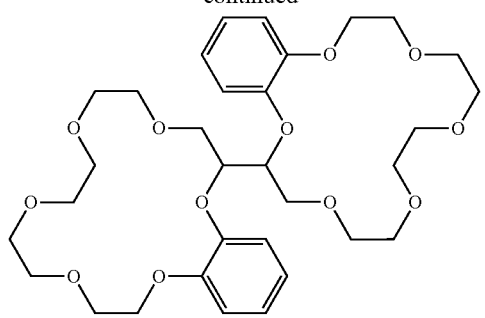
3-(2,5,8,11,14,17-Hexaoxabicyclo[16.4.0]docosa-1-(22),18,20-trien-3-yl)-2,5,8,11,14,17-hexaoxabicyclo[16.4.0]docosa-1(22),18,20-triene
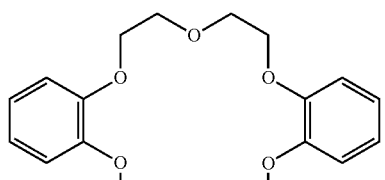
Dibenzo-18-crown-6
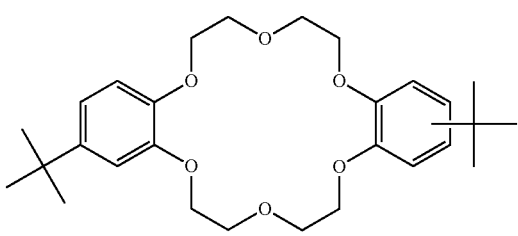
Di-tert butyl benzo-18-crown-6
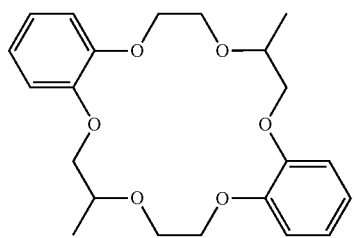
4,17-Dimethyl-2,3,11,12-dibenzo-1,4,7,10,13,16-hexaoxacyclooctadeca-2,11-diene
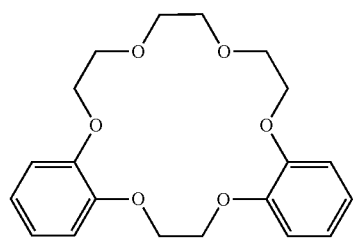
2,4-Dibenzo-18-crown-6
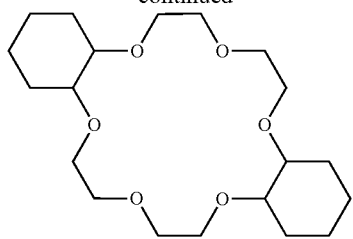
Dicyclohexyl 18-crown-6
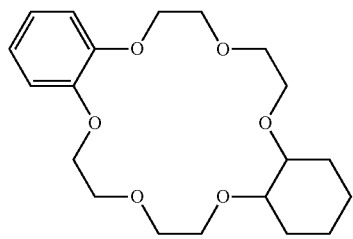
2,3-Benzo-11,12-cyclohexano-1,4,7,10,13,16-hexaoxacyclooctadecane
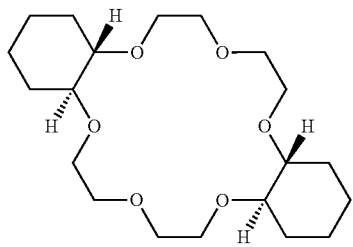
(1S,9R,14R,22S)-2,5,8,15,18,21-Hexaoxatricylo[20.4.0.09,14]hexacosane
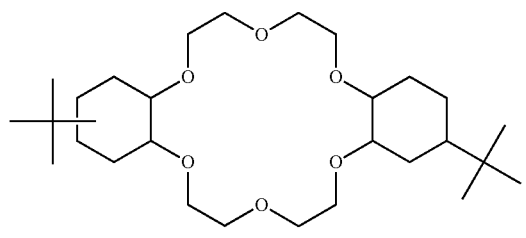
4,4′ (5′)di-t-butyl-cyclohexano-18-criwb-6
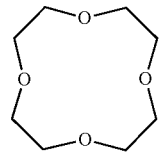
12-crown-4
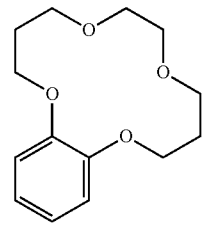
Benzo-12-crown-4

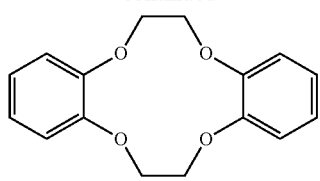
Dibenzo-12-crown-4
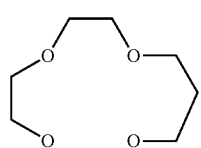
13-crown-4
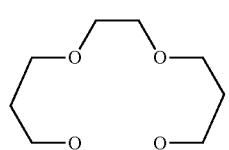
14-crown-4
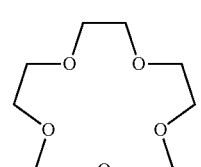
15-crown-5
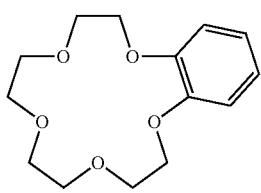
benzo-15-crown-5
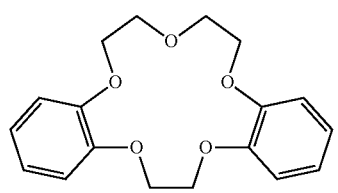
Dibenzo-15-crown-5
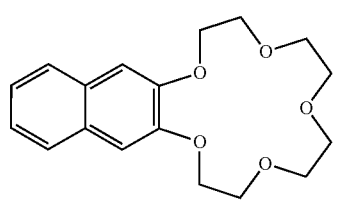
2,3-Naphtho-15-crown-5
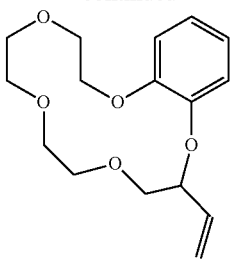
3-Ethenyl-2,5,8,11,14-pentaoxabicyclo[13.4.0]nonadeca-1(19),15,17-triene
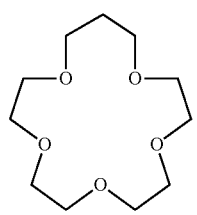
16-crown-5
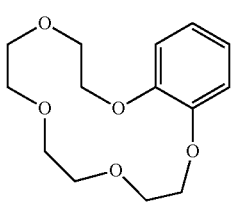
Benzo-15-crown-5
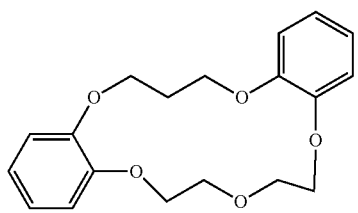
Dibenzo-16-crown-5
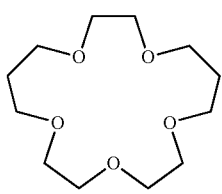
17-crown-5
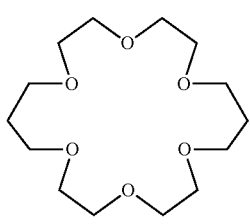
20-crown-6

-continued
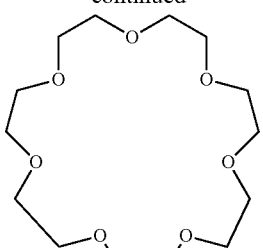
21-crown-7
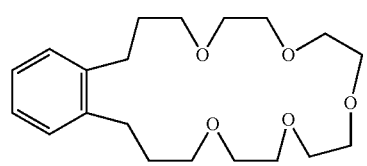
Benzo-21-crown-7
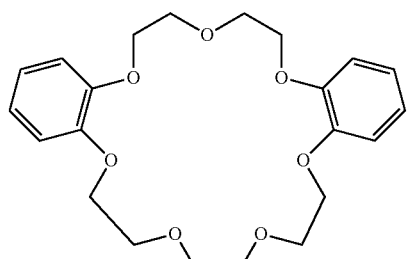
Dibenzo-21-crown-7
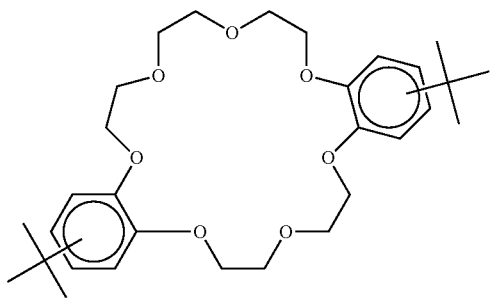
Di-(tert butyl benzo)-21-crown-7
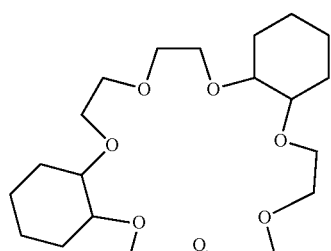
Dicyclohexano-21-crown-7
-continued
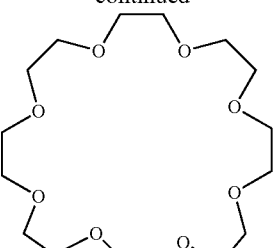
24-crown-8-ether
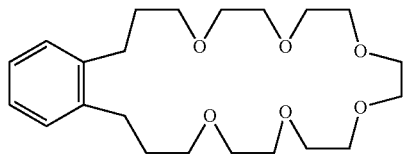
Benzo-24-crown-8 ether
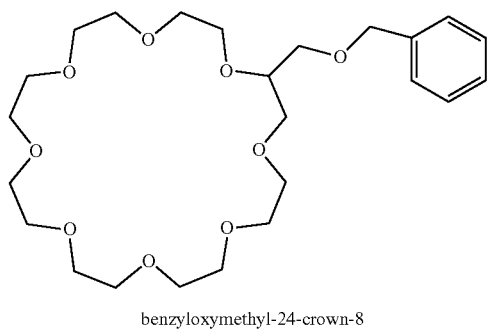
benzyloxymethyl-24-crown-8
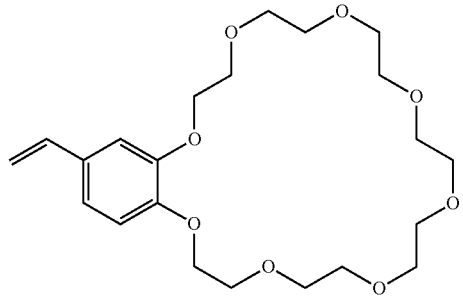
4'-Vinylbenzo-24-crown-8 ether
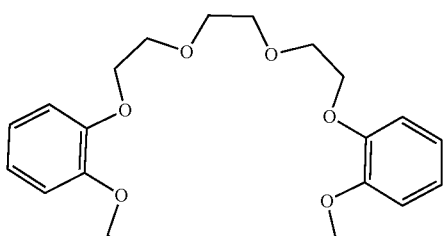
Dibenzo-24-crown-8
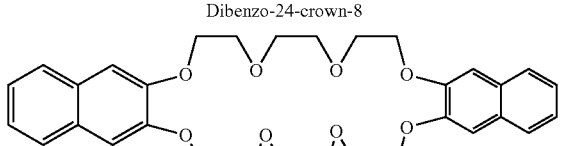
dinaphtho-24-crown-8

-continued
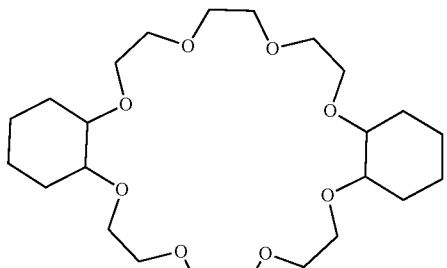
Dicyclohexano-24-crown-8
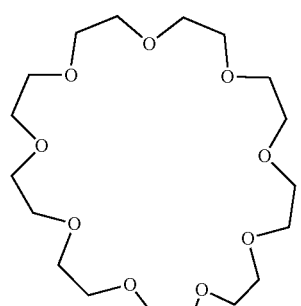
27-crown-9 ether
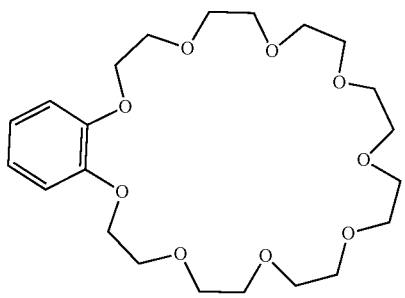
Benzo-27-crown-9 ether
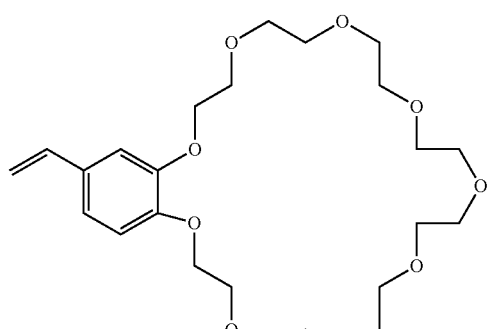
4'-Vinylbenzo-27-crown-9 ether
-continued
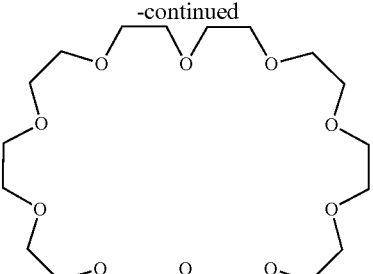
30-crown-10
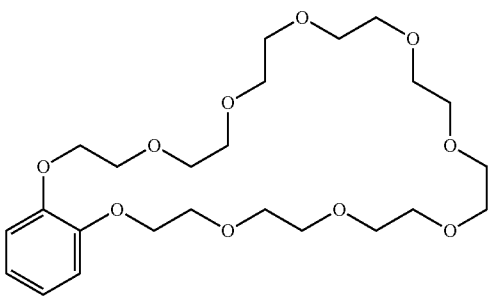
Benzo-30-crown-10
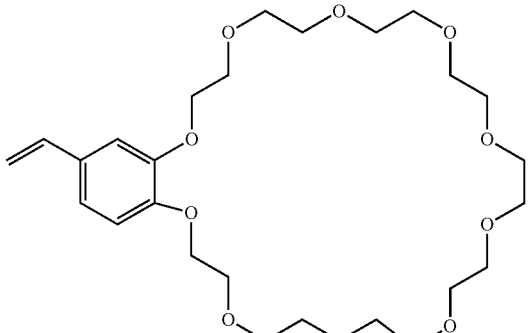
4'-Vinylbenzo-30-crown-10 ether
Dibenzo-30-crown-10
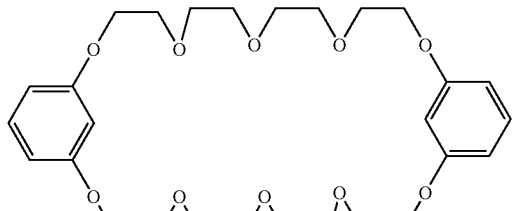
bis(m-phenylene)-32-crown-10
In further embodiments, the crown ether compound may be used to create a treated powder, which may be used to a prepare Si-dominant anodes. In additional embodiments, the crown ether compounds, as disclosed above, may be used as cathode additives by directly adding them into different types of cathode slurries.

Ethers can be typically categorized as chain ethers, aromatic ethers, and crown ethers. Ethers have been explored to improve the electrochemical properties of lithium-ion batteries. Crown ethers are compounds with at least three or more oxygen atoms incorporated in a monocyclic carbon backbone. The oxygen atoms are well situated to coordinate with a cation located at the interior of the ring, whereas the exterior of the ring is hydrophobic. Crown ethers with repeating units being ethyleneoxy ($-CH_2CH_2O-$) may have high affinity and selectivity to alkali metal ions, alkaline-earth metal ions, or transition metal ions and can encapsulate these metal ions into its cavity to form a complex. In Li-ion batteries, the crown ether-containing cathodes may improve the cell cycling and rate performance by trapping Mn ion or other transition metal ions and decreasing their solubilities from the cathode side. In addition, the high solvent-coordinating ability of ether groups can create free volume for ion motion, which facilitates the transport of solvent-solvated Li+ ions through the segmental movement of polymer chains. This can help increase the ionic conductivity and lithium transference number, stabilize the solvent and suppress the formation of thick SEI layers that hinder interfacial Li-ion transport.

The use of functional compound additives is a viable, economical and cost-effective strategy to modify the surface chemistry in batteries. This allows for potential circumvention of the massive volume change and initial capacity loss due to the continuous electrolyte decomposition in high capacity and reactive electrodes, such as Si anodes, Ni-rich NCA or NCM cathodes. Compound additives can be directly added into cathode slurries, anode (e.g. Si) slurries or used as separator modifiers. Additives can modify the SEI or CEI interphases in Li-ion batteries, thus altering and tuning their composition and corresponding electrochemical properties, such as cycle life, rate capability, energy/power densities, etc. In one embodiment, the functional compound additives are utilized as cathode additives to improve cycle performance of $Li[Ni_xCo_yAl_{1-x-y}]O_2$ (NCA) or $Li[Ni_xCo_yMn_{1-x-y}]O_2$ (NCM) cathode-based Li-ion full cells with Si-dominant anodes.

Compound additives, as part of electrode compositions, can form layers that can reduce or prevent the cracking and/or the continuous reduction of electrolyte solutions as the silicon-containing anode expands and contracts during cycling. Without being bound to the theory or mode of operation, it is believed that the presence of crown ether compounds in electrode compositions can result in a SEI and/or CEI layer on the surface of electrodes with improved performance. An SEI layer comprising crown ether compounds may demonstrate improved chemical stability and increased density. As such, the change in thickness and surface reactivity of the interface layer is limited, which may, in turn, facilitate reduction in capacity fade and/or generation of excessive gaseous byproducts during operation of the lithium-ion battery. A CEI layer comprising crown ether compounds may help minimize transition metal ion dissolution and structure changes on the cathode side and may provide favorable kinetics resulting in improved cycling stability and rate capability.

As discussed above, a lithium-ion battery typically includes a separator between an anode and a cathode. Separators may be formed as sheets or films, which are then stacked or rolled with the anode and cathode (e.g., electrodes) to form the battery. The separator may comprise a single continuous or substantially continuous sheet or film, which can be interleaved between adjacent electrodes of the electrode stack. The separator may be configured to facilitate electrical insulation between the anode and the cathode, while still permitting ionic transport. In some embodiments, the separator may comprise a porous material. In some embodiments, functional crown ether compounds are used to modify the separator to prepare different types of functional separators to improve the cycle performance of Li-ion batteries or Li-metal batteries.

The electrode additives described herein may be advantageously used to create electrodes that are utilized within an energy storage device. In some embodiments, energy storage devices may include batteries, capacitors, and battery-capacitor hybrids. In some embodiments, the energy storage device comprises lithium. In some embodiments, the energy storage device may comprise at least one electrode, such as an anode and/or cathode. In some embodiments, at least one electrode may be a Si-based electrode. In some embodiments, the Si-based electrode is a Si-dominant electrode, where silicon is the majority of the active material used in the electrode (e.g., greater than 50% silicon). In some embodiments, the energy storage device comprises a separator. In some embodiments, the separator is between a first electrode and a second electrode.

In some embodiments, the amount of silicon in the electrode material (active material) includes between about 30% and about 95% by weight, between about 50% and about 85% by weight, and between about 75% and about 95% by weight. In other embodiments, the amount of silicon in the electrode material may be at least about 30% by weight; greater than 0% and less than about 95% by weight; or between about 50% and about 95% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

Figure 2:
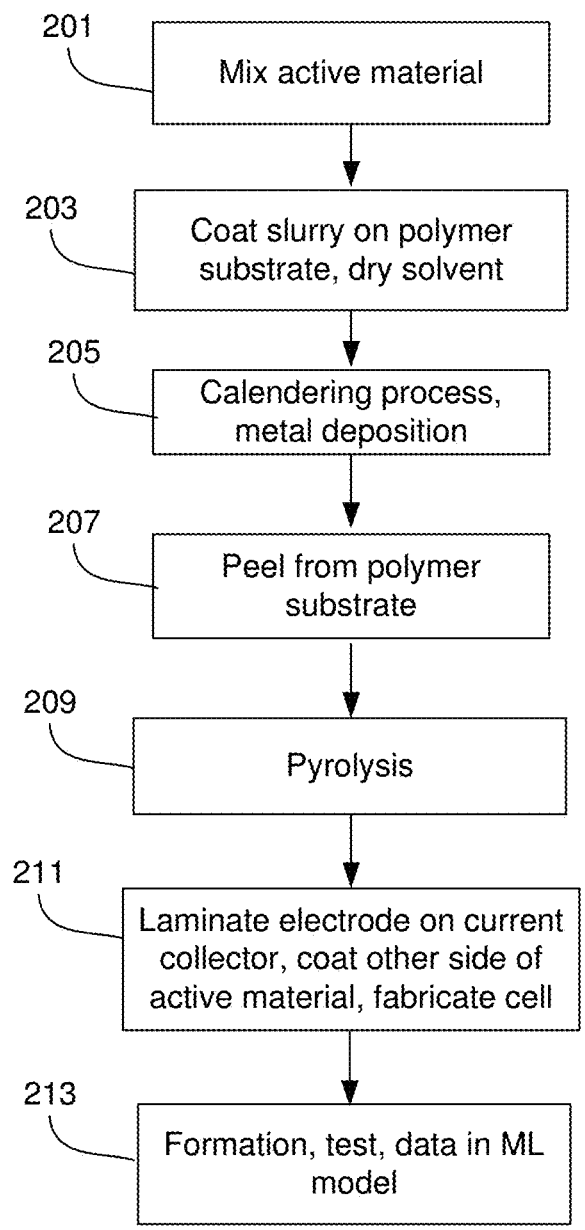
FIG. 2 is a flow diagram of a lamination process for forming a silicon-dominant anode cell, in accordance with an example embodiment of the disclosure.
Figure 3:
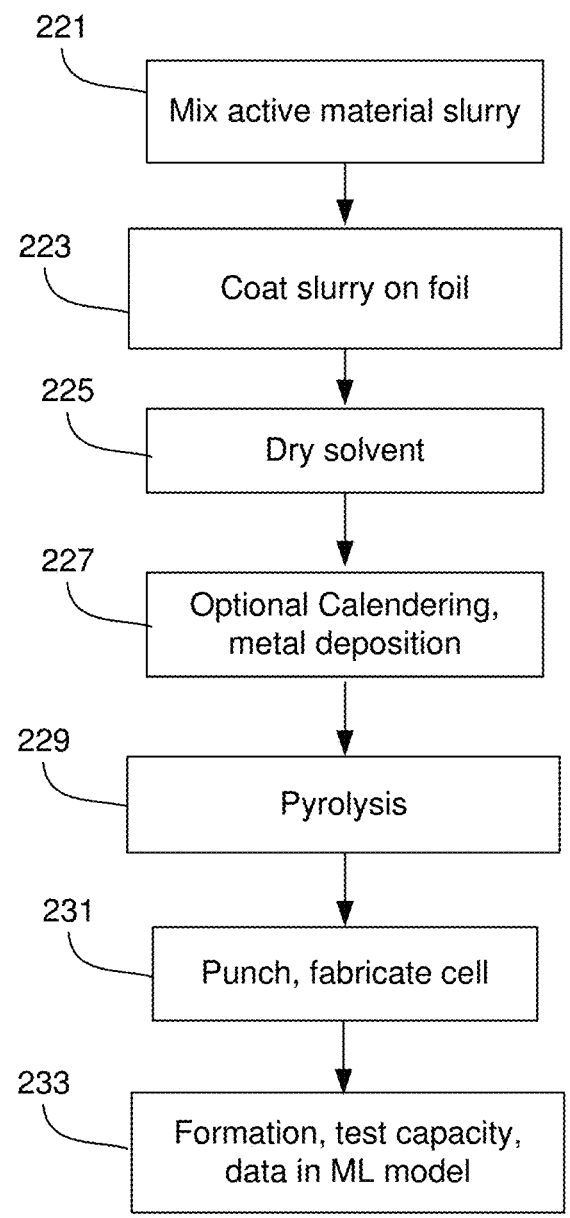
FIG. 3 is a flow diagram of a direct coating process for forming a silicon-dominant anode cell, in accordance with an example embodiment of the disclosure.

FIG. 2A is a flow diagram of a lamination process for forming a silicon-dominant anode cell, in accordance with an example embodiment of the disclosure. This process employs a high-temperature pyrolysis process on a substrate, layer removal, and a lamination process to adhere the active material layer to a current collector. This strategy may also be adopted by other anode-based cells, such as graphite, conversion type anodes, such as transition metal oxides, transition metal phosphides, and other alloy type anodes, such as Sn, Sb, Al, P, etc.

The raw electrode active material is mixed in step 201. In the mixing process, the active material may be mixed with a binder/resin (such as water-soluble PI, PAI, Phenolic or other water-soluble resins and mixtures and combinations thereof), solvent, rheology modifiers, surfactants, pH modifiers, and conductive additives. The materials may comprise carbon nanotubes/fibers, graphene sheets, metal polymers, metals, semiconductors, and/or metal oxides, for example. In one embodiment, silicon powder with a 1-30 or 5-30 μm particle size, for example, may then be dispersed in polyamic acid resin, polyamideimide, or polyimide (15-25% solids in N-Methyl pyrrolidone (NMP) or DI water) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%. The pH of the slurry can be varied from acidic to basic, which may be beneficial for controlling the solubility, conformation, or adhesion behavior of water-soluble polyelectrolytes, such as polyamic acid, carboxymethyl cellulose, or polyacrylic acid. Ionic or non-ionic surfactants may be added to facilitate the wetting of the insoluble components of the slurry or the substrates used for coating processes The particle size and mixing times may be varied to configure the electrode coating layer density and/or roughness. Furthermore, cathode electrode coating layers may be mixed in step 201, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 203, the slurry may be coated on a substrate. In this step, the slurry may be coated onto a Polyester, polyethylene terephthalate (PET), or Mylar film at a loading of, e.g., 2-4 mg/cm$^2$ and then undergo drying to an anode coupon with high Si content and less than 15% residual solvent content. This may be followed by an optional calendering process in step 205, where a series of hard pressure rollers may be used to finish the film/substrate into a smoother and denser sheet of material.

In step 207, the green film may then be removed from the PET, where the active material may be peeled off the polymer substrate, the peeling process being optional for a polypropylene (PP) substrate since PP can leave ~2% char residue upon pyrolysis. The peeling may be followed by a pyrolysis step 209 where the material may be heated to 600-1250 C for 1-3 hours, cut into sheets, and vacuum dried using a two-stage process (120° C. for 15 h, 220° C. for 5 h).

In step 211, the electrode material may be laminated on a current collector. For example, a 5-20 µm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

In step 213, the cell may be assessed before being subject to a formation process. The measurements may comprise impedance values, open-circuit voltage, and thickness measurements. During formation, the initial lithiation of the anode may be performed, followed by dilithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in the formation steps.

FIG. 2B is a flow diagram of a direct coating process for forming a silicon-dominant anode cell, in accordance with an example embodiment of the disclosure. This process comprises physically mixing the active material, conductive additive, and binder together, and coating it directly on a current collector before pyrolysis. This example process comprises a direct coating process in which an anode or cathode slurry is directly coated on a copper foil using a binder such as CMC, SBR, PAA, Sodium Alginate, PAI, PI and mixtures and combinations thereof.

In step 221, the active material may be mixed, e.g., a binder/resin (such as PI, PAI or phenolic), solvent (such as NMP, DI water, or other environmentally benign solvents or their mixtures and combinations thereof), and conductive additives. The materials may comprise carbon nanotubes/fibers, graphene sheets, metal polymers, metals, semiconductors, and/or metal oxides, for example. Silicon powder with a 1-30 µm particle size, for example, may then be dispersed in polyamic acid resin, polyamideimide, polyimide (15% solids in DI water or N-Methyl pyrrolidone (NMP)) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on copper foil. In the direct coating process described here, an anode slurry is coated on a current collector with residual solvent followed by a calendering process for densification followed by pyrolysis (~500-800° C.) such that carbon precursors are partially or completely converted into glassy carbon or pyrolytic carbon. Similarly, cathode active materials may be coated on a foil material, such as aluminum, for example. The active material layer may undergo drying in step 225 resulting in reduced residual solvent content. An optional calendering process may be utilized in step 227 where a series of hard pressure rollers may be used to finish the film/substrate into a smoother and denser sheet of material. In step 227, the foil and coating proceed through a roll press for lamination.

In step 229, the active material may be pyrolyzed by heating to 500-1000° C. such that carbon precursors are partially or completely converted into glassy carbon. Pyrolysis can be done either in roll form or after punching. If done in roll form, the punching is done after the pyrolysis process. The pyrolysis step may result in an anode active material having silicon content greater than or equal to 50% by weight, where the anode has been subjected to heating at or above 400 degrees Celsius. In an example scenario, the anode active material layer may comprise 20 to 95% silicon and in yet another example scenario may comprise 50 to 95% silicon by weight. In instances where the current collector foil is not pre-punched/pre-perforated, the formed electrode may be perforated with a punching roller, for example. The punched electrodes may then be sandwiched with a separator and electrolyte to form a cell.

In step 233, the cell may be assessed before being subject to a formation process. The measurements may comprise impedance values, open-circuit voltage, and thickness measurements. During formation, the initial lithiation of the anode may be performed, followed by dilithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in the formation steps.

In some aspects, energy storage devices such as batteries are provided. In some embodiments, the energy storage device includes a first electrode and a second electrode, wherein at least one of the first electrode and the second electrode is a Si-based electrode. In some embodiments, the energy storage device includes a separator between the first electrode and the second electrode. In some embodiments, crown ether compounds are added directly to electrode slurries to prepare directly coated electrodes. Advantages of using crown ether compounds in electrodes include, but are not limited to, increased cycle life, increased rate capability, and power density and/or decreased impedance increase in electrode interfaces. Specifically considering additives for cathodes, using crown ether compounds may result in decreased transition metal ion dissolution from the cathode side.

In some embodiments, the second electrode is a Si-dominant electrode. In some embodiments, the second electrode comprises a self-supporting composite material film. In some embodiments, the composite material film comprises greater than 0% and less than about 95% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film.

In some embodiments, the battery may be capable of at least 200 cycles with more than 80% cycle retention when cycling with a C-rate of >2C cycling between an upper voltage of >4V and a lower cut-off voltage of <3.3V. In other embodiments, the battery may be capable of at least 200 cycles with more than 80% cycle retention when cycling with a C-rate of >2C cycling between an upper voltage of >4V and a lower cut-off voltage of <3.3V.

The below example devices and processes for device fabrication are generally described below, and the performances of lithium-ion batteries with different electrode additives may be evaluated.

Tests may be carried out using crown ether compounds, e.g., as a cathode additive. For example, 1 wt % benzo-15-crown-5 (B15C5), 1 wt % Benzo-18-crown-6-ether (B18C6), or 1 wt % Dibenzo-21-crown-7 (DB21C7) may be incorporated into NCM811 slurries to prepare additive-containing NCM811 cathodes. The corresponding coin type full cells may be built with Si-dominant anodes and additive-containing, or -free (control) NCM811 cathodes and may be tested using a 1C/0.5C charge/discharge cycle regime with the working voltage window of 4.2V to 3.1 V.

Figure 4:
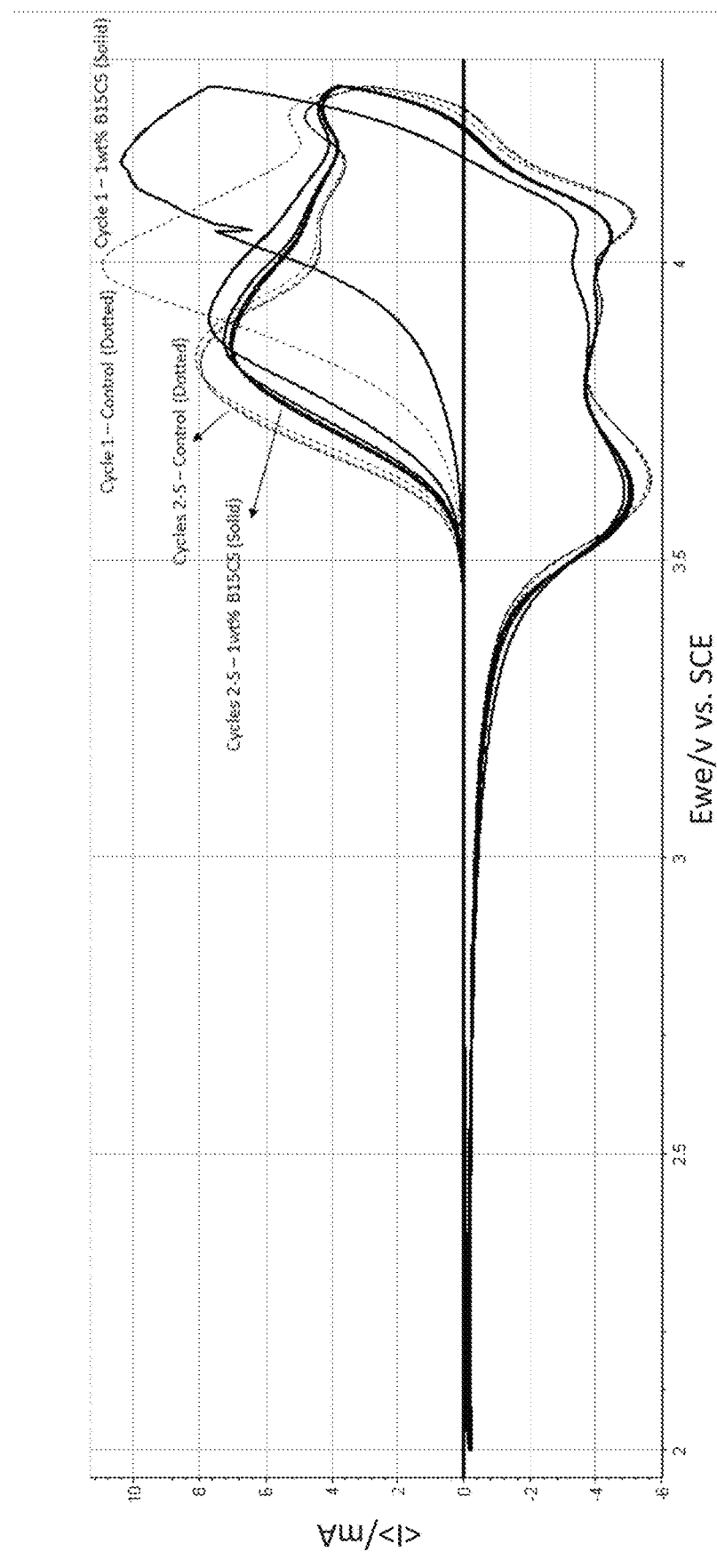
FIG. 4 shows cyclic voltammetry (CV) curves of NCM811 cathode-based coin half cells with 1 wt % benzo-15-crown-5 (B15C5) with a voltage range of 2.0-4.3 V, in accordance with an example embodiment of the disclosure.

FIG. 4. Cyclic voltammetry (CV) curves of NCM811 cathode-based coin half cells with 1 wt % benzo-15-crown-5 (B15C5). The cathode used may be: (dotted line)—NCM811 Control, (solid line)—1 wt % B15C5-containing NCM811. The electrolyte formulation used may be 1.2 M LiPF$_6$ in FEC/EMC (3/7 wt %). The Si-dominant anodes contain about 80 wt % Si, 5 wt % graphite and 15 wt % glassy carbon (from resin) and may be laminated on 15 μm Cu foil. The average loading is about 2-5 mg/cm$^2$. The control cathodes contain about 92 wt % NCM811, 4 wt % Super P and 4 wt % PVDF5130, and may be coated on 15 μm Al foil. The average loading may be about 20-30 mg/cm$^2$. The 1 wt % benzo-15-crown-5 (B115C5)-containing NCM811 cathodes contain about 91 wt % NCM811, 1 wt % B15C5, 4 wt % Super P and 4 wt % PVDF5130, and also may be coated on 15 μm Al foil with a similar loading with control. The CV measurements were carried out in the voltage range of 2-4.3 V at a scan rate of 0.2 mV s$^{-1}$ using VMP3 equipment.

FIG. 4 shows that there is a clear oxidation peak appearing at ~4.0 V (vs. Li/Li$^+$) for the cell with B15C5-free NCM811 cathode (control) in the initial charge. This peak for 1 wt % B15C5-containing NCM811 cathode-based cell shifts to ~4.2 V (vs. Li/Li$^+$) in the initial charge. In the following scanning cycles, the oxidation peak-related voltage is higher while the reduction peaks are lower for the 1 wt % B15C5-containing NCM811 half cells than the control. The data shows that the presence of B15C5 may increase the polarization and interfacial impedance of NCM811 cathode in a voltage ranges of 2-4.3 V.

Figure 5B:
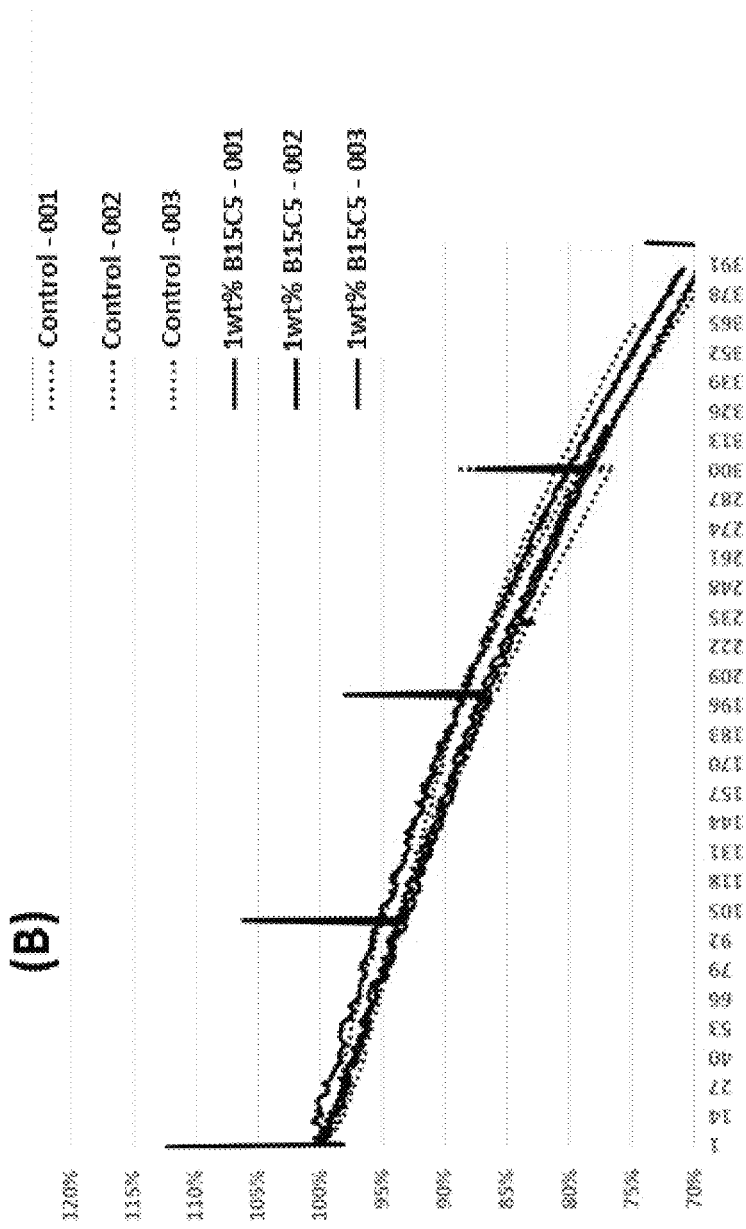

FIG. 5. Capacity retention (FIG. 5A) and Normalized capacity retention (FIG. 5B) of Si-dominant anode// NCM811 cathode coin full cells. The cathode used may be: (dotted line)—NCM811 Control, (solid line)—1 wt % benzo-15-crown-5 (B15C5)-containing NCM811. The Si-dominant anodes contain about 80 wt % Si, 5 wt % graphite and 15 wt % glassy carbon (from resin) and may be laminated on 15 μm Cu foil. The average loading is about 2-5 mg/cm$^2$. The control cathodes contain about 92 wt % NCM811, 4 wt % Super P and 4 wt % PVDF5130, and may be coated on 15 μm Al foil. The average loading is about 20-30 mg/cm$^2$. The 1 wt % benzo-15-crown-5 (B15C5)-containing NCM811 cathodes contain about 91 wt % NCM811, 1 wt % B15C5, 4 wt % Super P and 4 wt % PVDF5130, and also may be coated on 15 μm Al foil with a similar loading with control. The cells may be tested at 25° C.

The long-term cycling programs include: (i) At the 1st cycle, Charge at 0.33C to 4.2 V until 0.05C, rest 5 minutes, discharge at 0.33C to 3.1 V, rest 5 minutes; and (ii) from the 2nd cycle, Charge at 1C to 4.2 V until 0.05C, rest 5 minutes, discharge at 0.5C to 3.1 V, rest 5 minutes. After every 100 cycles, the test conditions in the 1st cycle may be repeated.

FIG. 5 shows the 1 wt % B15C5-containing NCM811 cathode-based coin full cells have similar cycle performance with the control.

Figure 6:
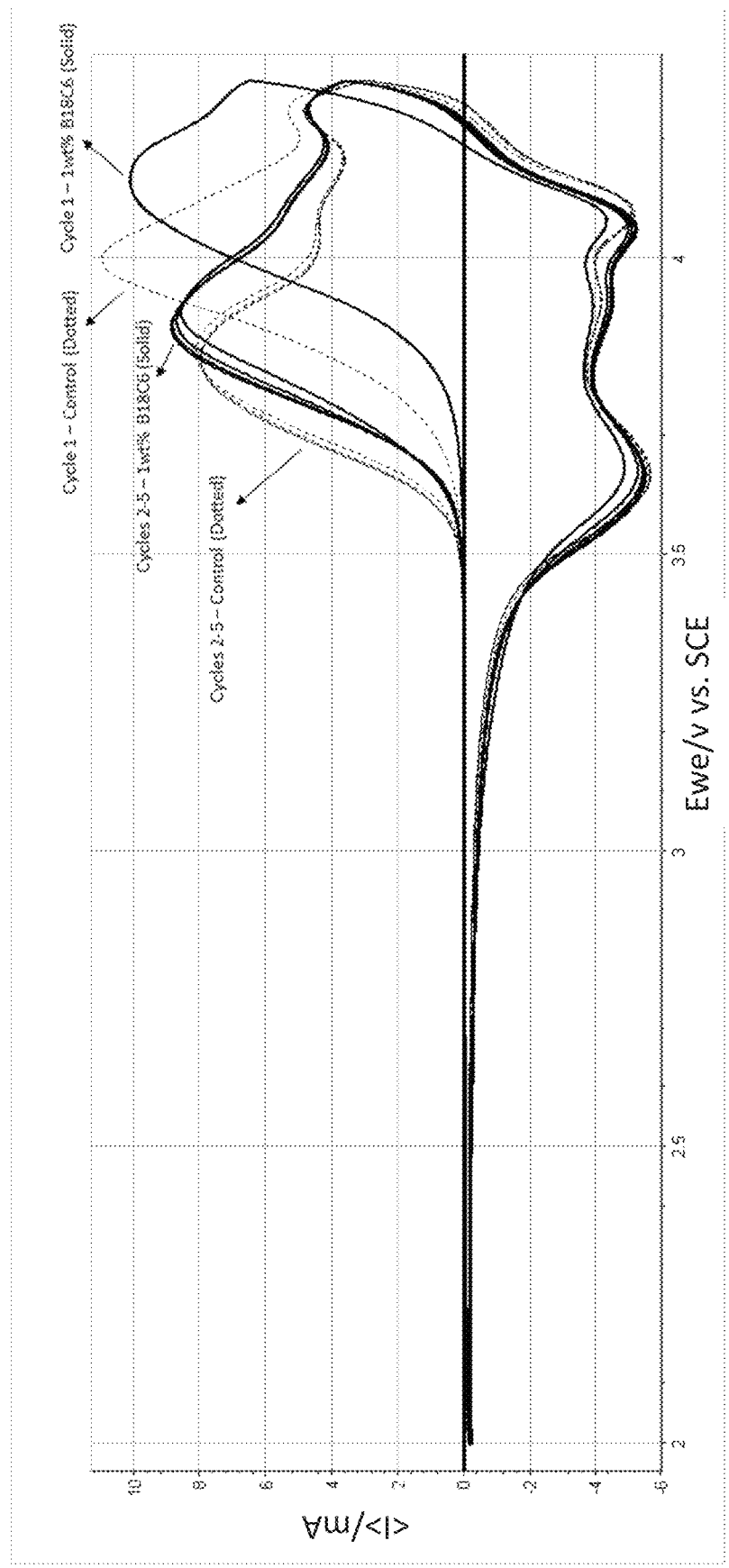
FIG. 6 shows cyclic voltammetry (CV) curves of NCM811 cathode-based coin half cells with 1 wt % Benzo-18-crown-6-ether (B18C6) with a voltage range of 2.0-4.3 V, in accordance with an example embodiment of the disclosure.

FIG. 6. Cyclic voltammetry (CV) curves of NCM811 cathode-based coin half cells with 1 wt % Benzo-18-crown-6-ether (B18C6). The cathode used may be: (dotted line)— NCM811 Control, (solid line)—1 wt % B18C6-containing NCM811. The electrolyte formulation used may be 1.2 M LiPF$_6$ in FEC/EMC (3/7 wt %). The Si-dominant anodes contain about 80 wt % Si, 5 wt % graphite and 15 wt % glassy carbon (from resin) and may be laminated on 15 μm Cu foil. The average loading is about 2-5 mg/cm$^2$. The control cathodes contain about 92 wt % NCM811, 4 wt % Super P and 4 wt % PVDF5130, and may be coated on 15 μm Al foil. The average loading may be about 20-30 mg/cm$^2$. The 1 wt % Benzo-18-crown-6-ether (B18C6)-containing NCM811 cathodes contain about 91 wt % NCM811, 1 wt % B18C6, 4 wt % Super P and 4 wt % PVDF5130, and also may be coated on 15 μm Al foil with a similar loading with control. The CV measurements were carried out in the voltage range of 2-4.3 V at a scan rate of 0.2 mV s$^{-1}$ using VMP3 equipment.

FIG. 6 shows that there is a clear oxidation peak appearing at ~4.0 V (vs. Li/Li+) for the cell with B18C6-free NCM811 cathode (control) in the initial charge. This peak for 1 wt % B18C6-containing NCM811 cathode-based cell shifts to ~4.2 V (vs. Li/Li+) in the initial charge. In the following scanning cycles, the oxidation peak-related voltage are higher while the reduction peaks are lower for the 1 wt % B18C6-containing NCM811 half cells than the control. The data shows that the presence of B18C6 may increase the polarization and interfacial impedance of NCM811 cathode in a voltage ranges of 2-4.3 V.

Figure 7A:
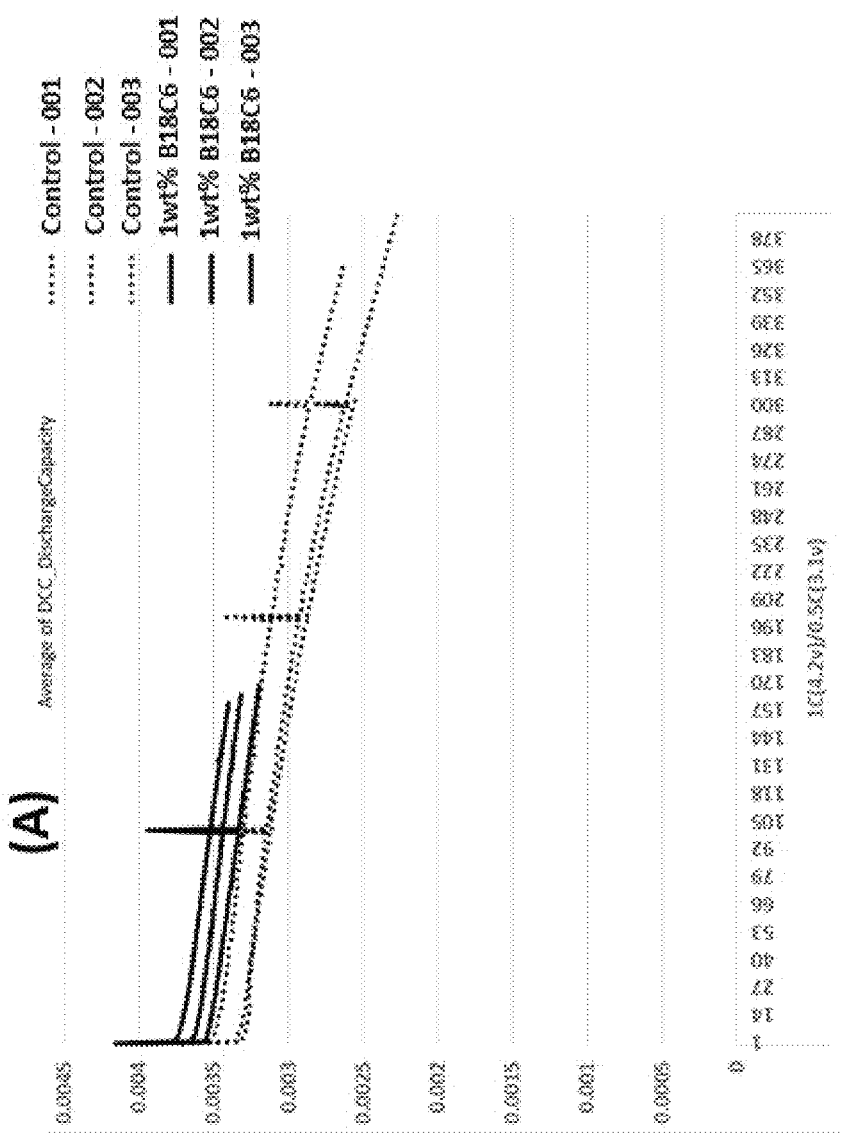
FIGS. 7A and 7B show the Capacity retention (FIG. 7A) and Normalized capacity retention (FIG. 7B) of Si-dominant anode//NCM811 cathode coin full cells. The cathode used may be: (dotted line)—NCM811 Control, (solid line)—1 wt % Benzo-18-crown-6-ether (B18C6)-containing NCM811, in accordance with an example embodiment of the disclosure.
Figure 7B:
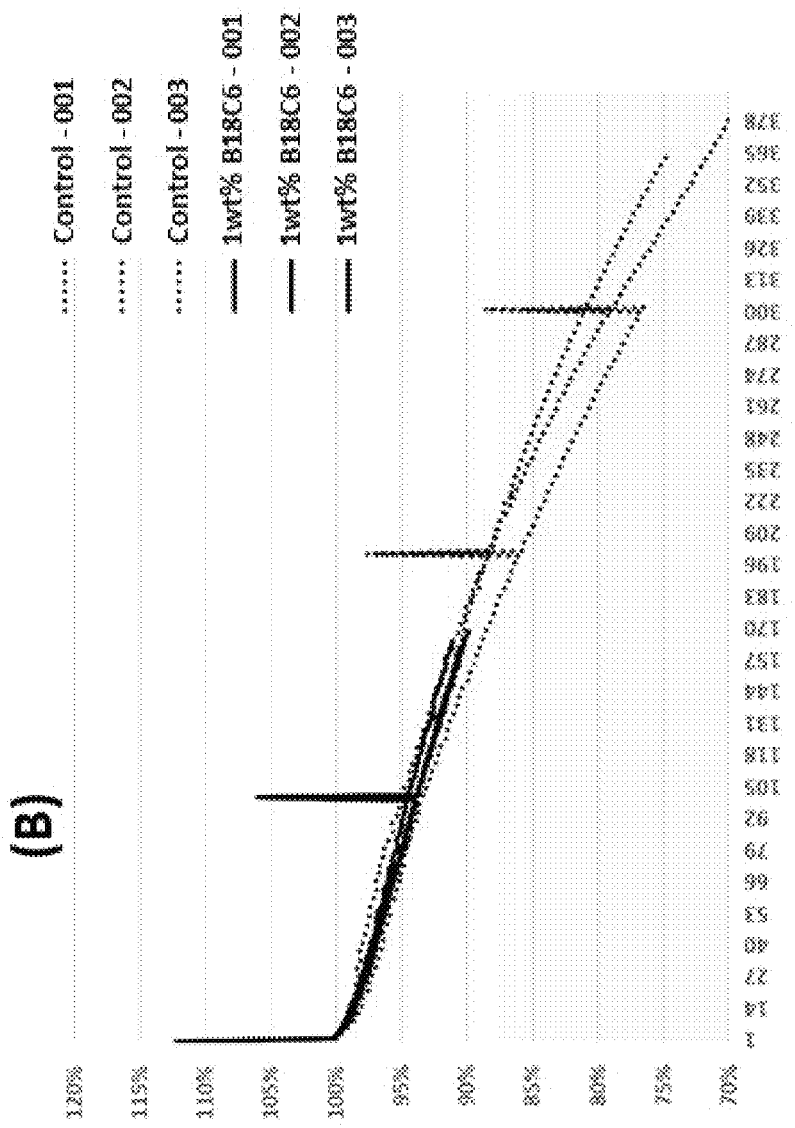

FIG. 7. Capacity retention (FIG. 7A) and Normalized capacity retention (FIG. 7B) of Si-dominant anode// NCM811 cathode coin full cells. The cathode used may be: (dotted line)—NCM811 Control, (solid line)—1 wt % Benzo-18-crown-6-ether (B18C6)-containing NCM811. The Si-dominant anodes contain about 80 wt % Si, 5 wt % graphite and 15 wt % glassy carbon (from resin) and may be laminated on 15 μm Cu foil. The average loading is about 2-5 mg/cm$^2$. The control cathodes contain about 92 wt % NCM811, 4 wt % Super P and 4 wt % PVDF5130, and may be coated on 15 μm Al foil. The average loading is about 20-30 mg/cm$^2$. The 1 wt % Benzo-18-crown-6-ether (B18C6)-containing NCM811 cathodes contain about 91 wt % NCM811, 1 wt % B18C6, 4 wt % Super P and 4 wt % PVDF5130, and also may be coated on 15 μm Al foil with a similar loading with control. The cells may be tested at 25° C.

The long-term cycling programs are the same as shown in FIG. 5.

FIG. 7 shows the 1 wt % B18C6-containing NCM811 cathode-based coin full cells have slightly better cycle performance than the control.

Figure 8:
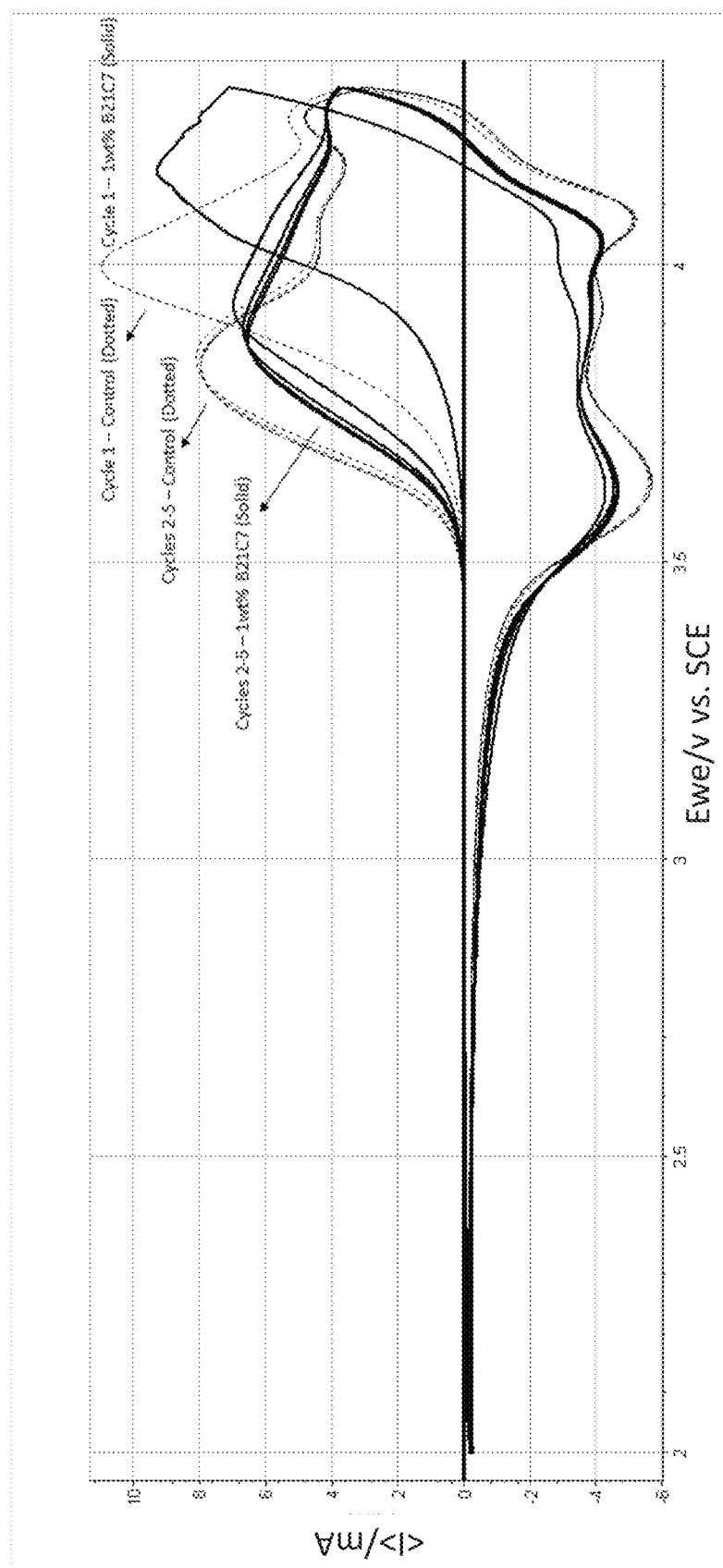
FIG. 8 shows cyclic voltammetry (CV) curves of NCM811 cathode-based coin half cells with 1 wt % Dibenzo-21-crown-7 (DB21C7) with a voltage range of 2.0-4.3 V, in accordance with an example embodiment of the disclosure.

FIG. 8. Cyclic voltammetry (CV) curves of NCM811 cathode-based coin half cells with 1 wt % Dibenzo-21-crown-7 (DB21C7). The cathode used may be: (dotted line)—NCM811 Control, (solid line)—1 wt % DB21C7-containing NCM811. The electrolyte formulation used may be 1.2 M LiPF$_6$ in FEC/EMC (3/7 wt %). The Si-dominant anodes contain about 80 wt % Si, 5 wt % graphite and 15 wt % glassy carbon (from resin) and may be laminated on 15 μm Cu foil. The average loading is about 2-5 mg/cm$^2$. The control cathodes contain about 92 wt % NCM811, 4 wt % Super P and 4 wt % PVDF5130, and may be coated on 15 μm Al foil. The average loading may be about 20-30 mg/cm$^2$. The 1 wt % Dibenzo-21-crown-7 (DB21C7)-containing NCM811 cathodes contain about 91 wt % NCM811, 1 wt % DB21C7, 4 wt % Super P and 4 wt % PVDF5130, and also may be coated on 15 μm Al foil with a similar loading with control. The CV measurements were carried out in the voltage range of 2-4.3 V at a scan rate of 0.2 mV s$^{-1}$ using VMP3 equipment.

FIG. 8 shows that there is a clear oxidation peak appearing at ~4.0 V (vs. Li/Li+) for the cell with DB21C7-free NCM811 cathode (control) in the initial charge. This peak for 1 wt % DB21C7-containing NCM811 cathode-based cell shifts to ~4.2 V (vs. Li/Li+) in the initial charge. In the following scanning cycles, the oxidation peak-related voltage are higher while the reduction peaks are lower for the 1 wt % DB21C7-containing NCM811 half cells than the control. The data shows that the presence of DB21C7 may increase the polarization and interfacial impedance of NCM811 cathode in a voltage ranges of 2-4.3 V.

Figure 9A:
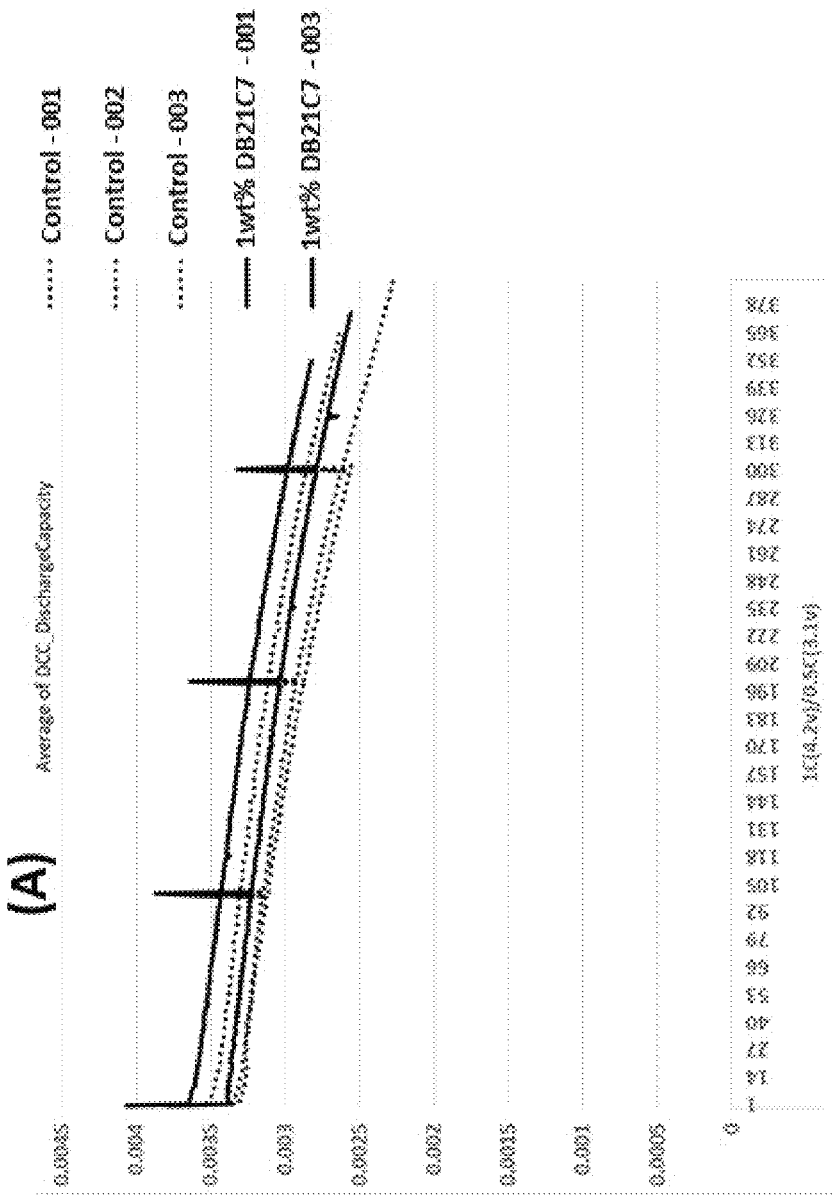
FIGS. 9A and 9B show the Capacity retention (FIG. 9A) and Normalized capacity retention (FIG. 9B) of Si-dominant anode//NCM811 cathode coin full cells. The cathode used may be: (dotted line)—NCM811 Control, (solid line)—1 wt % Dibenzo-21-crown-7 (DB21C7)-containing NCM811, in accordance with an example embodiment of the disclosure.
Figure 9B:
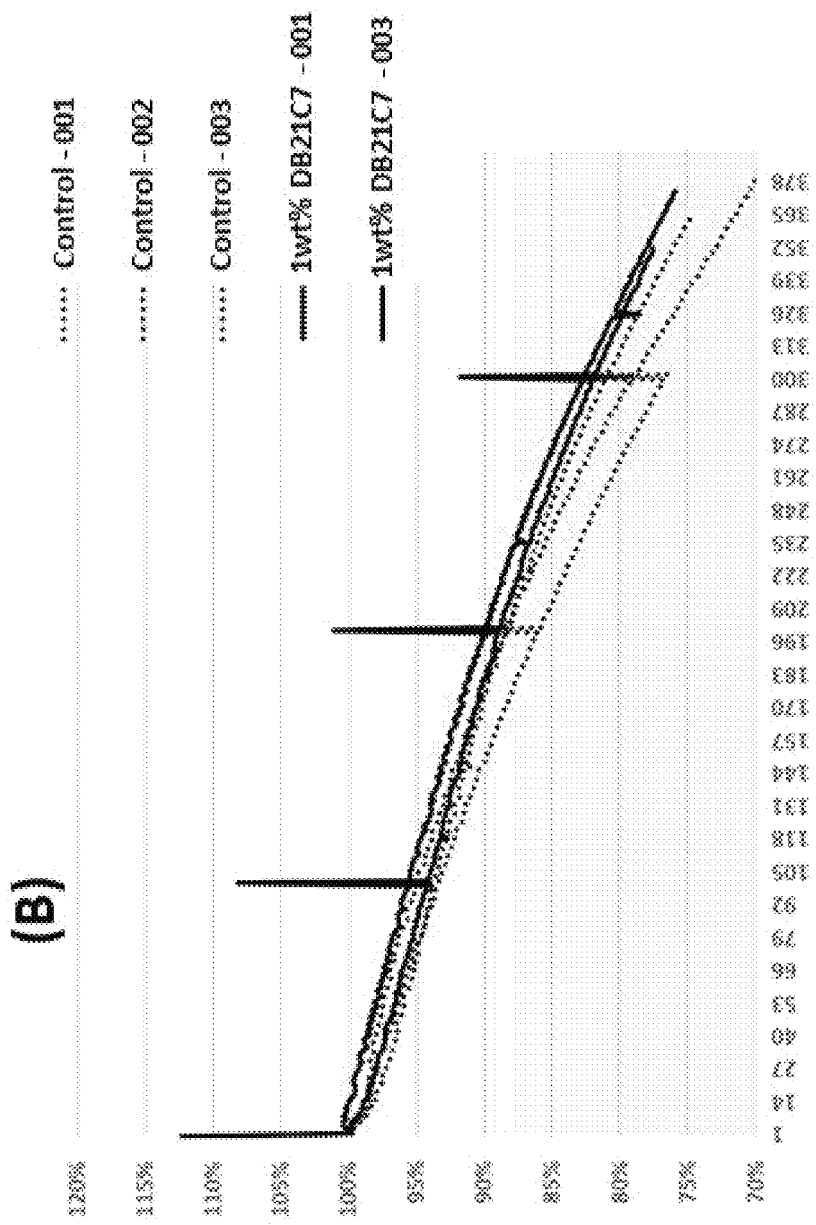

FIG. 9. Capacity retention (FIG. 9A) and Normalized capacity retention (FIG. 9B) of Si-dominant anode// NCM811 cathode coin full cells. The cathode used may be: (dotted line)—NCM811 Control, (solid line)—1 wt % Dibenzo-21-crown-7 (DB21C7)-containing NCM811. The Si-dominant anodes contain about 80 wt % Si, 5 wt % graphite and 15 wt % glassy carbon (from resin) and may be laminated on 15 μm Cu foil. The average loading is about 2-5 mg/cm$^2$. The control cathodes contain about 92 wt % NCM811, 4 wt % Super P and 4 wt % PVDF5130, and may be coated on 15 μm Al foil. The average loading is about 20-30 mg/cm$^2$. The 1 wt % Dibenzo-21-crown-7 (DB21C7)-containing NCM811 cathodes contain about 91 wt % NCM811, 1 wt % DB21C7, 4 wt % Super P and 4 wt % PVDF5130, and also may be coated on 15 μm Al foil with a similar loading with control. The cells may be tested at 25° C.

The long-term cycling programs are the same as shown in FIG. 5.

FIG. 7 shows the 1 wt % DB21C7-containing NCM811 cathode-based coin full cells have slightly better cycle performance than the control.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry, or a device is "operable" to perform a function whenever the battery, circuitry, or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An energy storage device comprising:
    a first electrode and a second electrode, wherein one or both of the first electrode and the second electrode is a Si-based electrode;
    a separator between the first electrode and the second electrode; and
    an electrolyte composition; wherein
    one or more of said first electrode and said second electrode comprises at least one additive, wherein said additive comprises a crown ether compound; and
    wherein said crown ether compound comprises one or more of benzo-18-crown-6-ether (B18C6); 2,5,8,11,14,17-Hexaoxabicyclo[16.4.0]docosane; 4'-Methylbenzo-18-crown-6; 4'-tert-Butylbenzo-18-crown-6; 4'-Aminobenzo-18-crown-6; 4-Vinylbenzo-18-crown-6; 20-Ethynyl-2,5,8,11,14,17-hexaoxabicyclo[16.4.0]docosa-1(18),19,21-triene; 2,5,8,11,14,17-Hexaoxabicyclo[16.4.0]docosa-1(22),18,20-triene-3,3-dicarbonitrile; 1-(2,5,8,11,14,17-hexaoxabicyclo[16.4.0]docosa- 1(18),19,21-trien-20-yl)piperidine; 3-Ethenyl-2,5,8,11,14,17-hexaoxabicyclo[16.4.0]docosa-1(22),18,20-triene; 2,5,8,11,14-Pentaoxa-17-azabicyclo[16.4.0]docosa-1(22),18,20-triene; 3-Tert-Butyl-2,5,8,11,14,17-Hexaoxabicyclo[16.4.0]Docosa-1(22),18,20-Triene; 4-Methyl-2,5,8,11,14,17-Hexaoxabicyclo[16.4.0]Docosa-1(22),18,20-Triene; 6-propyl-2,5,8,11,14,17-hexaoxabicyclo[16.4.0]docosa-1(22),18,20-triene; 7-methyl-2,5,8,11,14,17-hexaoxabicyclo[16.4.0]docosa-1(22),18,20-triene; 3-Methyl-2,5,8,11,14,17-hexaoxabicyclo[16.4.0]docosa-1(22),18,20-triene; 3-(2,5,8,11,14,17-Hexaoxabicyclo[16.4.0]docosa-1(22),18,20-trien-3-yl)-2,5,8,11,14,17-hexaoxabicyclo[16.4.0]docosa-1(22),18,20-triene; Dibenzo-18-crown-6; Di-tert butyl benzo 18-crown-6; 4,17-Dimethyl-2,3,11,12-dibenzo-1,4,7,10,13,16-hexaoxacyclooctadeca-2,11-diene; 2,4-Dibenzo-18-crown-6; Dicyclohexyl 18-crown-6; 2,3-Benzo-11,12-cyclohexano-1,4,7,10,13,16-hexaoxacyclooctadecane; (1S,9R,14R,22S)-2,5,8,15,18,21-Hexaoxatricyclo[20.4.0.09,14]hexacosane; 4,4' (5')di-t-butyl-cyclohexano-18-crown-6; 13-crown-4; 14-crown-4; Dibenzo-15-crown-5; 2,3-Naphtho-15-crown-5; 3-Ethenyl-2,5,8,11,14-pentaoxabicyclo[13.4.0]nonadeca-1(19),15,17-triene; 16-crown-5; Benzo-16-crown-5; Dibenzo-16-crown-5; 17-crown-5; 20-crown-6; Benzo-21-crown-7; Dibenzo-21-crown-7; Di-(tert butyl benzo) -21-crown-7; Dicyclohexano-21-crown-7; 24-crown-8 ether; Benzo-24-crown-8 ether; benzyloxymethyl-24-crown-8; 4'-Vinylbenzo-24-crown-8 ether; Dibenzo-24-crown-8; dinaphtho-24-crown-8; Dicyclohexano-24-crown-8; 27-crown-9ether; Benzo-27-crown-9 ether; 4'-Vinylbenzo-27-crown-9 ether; 30-crown-10; Benzo-30-crown-10; 4'-Vinylbenzo-30-crown-10 ether; Dibenzo-30-crown-10; and bis(m-phenylene)-32-crown-10; and wherein the second electrode is a Si-dominant electrode.

2. The energy storage device of claim 1, wherein the second electrode comprises a self-supporting composite material film.

3. The energy storage device of claim 1, wherein the Si-dominant electrode comprises:
greater than 0% and less than about 95% by weight of silicon particles, and
greater than 0% and less than about 90% by weight of one or more types of carbon phases,
wherein at least one of the one or more types of carbon phases is a substantially continuous phase that holds the Si-dominant electrode together such that the silicon particles are distributed throughout the Si-dominant electrode.

4. A method of forming an energy storage device, the method comprising:
forming an energy storage device comprising a cathode, an electrolyte composition, and an anode;
wherein one or more of said anode and said cathode comprises at least one additive,
wherein said additive comprises a crown ether compound;
wherein one or both of said cathode and said anode is formed using, at least, the following steps:
said electrode material is mixed to create a slurry;
said additive is added to said slurry;
said slurry is coated on metal foil; and
the coated metal foil is dried; and
wherein said crown ether compound comprises one or more of benzo-18-crown-6-ether (B18C6); 2,5,8,11,14,17-Hexaoxabicyclo[16.4.0]docosane; 4'-Methylbenzo-18-crown-6; 4'-tert-Butylbenzo-18-crown-6; 4'-Aminobenzo-18-crown-6; 4-Vinylbenzo-18-crown-6; 20-Ethynyl-2,5,8,11,14,17-hexaoxabicyclo[16.4.0]docosa-1(18),19,21-triene; 2,5,8,11,14,17-Hexaoxabicyclo[16.4.0]docosa-1(22),18,20-triene-3,3-dicarbonitrile; 1-(2,5,8,11,14,17-hexaoxabicyclo[16.4.0]docosa-1(18),19,21-trien-20-yl)piperidine; 3-Ethenyl-2,5,8,11,14,17-hexaoxabicyclo[16.4.0]docosa-1(22),18,20-triene; 2,5,8,11,14-Pentaoxa-17-azabicyclo[16.4.0]docosa-1(22),18,20-triene; 3-Tert-Butyl-2,5,8,11,14,17-Hexaoxabicyclo[16.4.0]Docosa-1(22),18,20-Triene; 4-Methyl-2,5,8,11,14,17-Hexaoxabicyclo[16.4.0]Docosa-1(22),18,20-Triene; 6-propyl-2,5,8,11,14,17-hexaoxabicyclo[16.4.0]docosa-1(22),18,20-triene; 7-methyl-2,5,8,11,14,17-hexaoxabicyclo[16.4.0]docosa-1(22),18,20-triene; 3-Methyl-2,5,8,11,14,17-hexaoxabicyclo[16.4.0]docosa-1(22),18,20-triene; 3-(2,5,8,11,14,17-Hexaoxabicyclo[16.4.0]docosa-1(22),18,20-trien-3-yl)-2,5,8,11,14,17-hexaoxabicyclo[16.4.0]docosa-1(22),18,20-triene; Dibenzo-18-crown-6; Di-tert butyl benzo 18-crown-6; 4,17-Dimethyl-2,3,11,12-dibenzo-1,4,7,10,13,16-hexaoxacyclooctadeca-2,11-diene; 2,4-Dibenzo-18-crown-6; Dicyclohexyl 18-crown-6; 2,3-Benzo-11,12-cyclohexano-1,4,7,10,13,16-hexaoxacyclooctadecane; (1S,9R,14R,22S)-2,5,8,15,18,21-Hexaoxatricyclo[20.4.0.09,14]hexacosane; 4,4' (5')di-t-butyl-cyclohexano-18-crown-6; Benzo 12 crown 4; Dibenzo 12 crown 4; 13-crown-4; 14-crown-4; Dibenzo-15-crown-5; 2,3-Naphtho-15-crown-5; 3-Ethenyl-2,5,8,11,14-pentaoxabicyclo[13.4.0]nonadeca-1(19),15,17-triene; 16-crown-5; Benzo-16-crown-5; Dibenzo-16-crown-5; 17-crown-5; 20-crown-6; Benzo-21-crown-7; Dibenzo-21-crown-7; Di-(tert butyl benzo) -21-crown-7; Dicyclohexano-21-crown-7; 24-crown-8 ether; Benzo-24-crown-8 ether; benzyloxymethyl-24-crown-8; 4'-Vinylbenzo-24-crown-8 ether; Dibenzo-24-crown-8; dinaphtho-24-crown-8; Dicyclohexano-24-crown-8; 27-crown-9 ether; Benzo-27-crown-9 ether; 4'-Vinylbenzo-27-crown-9 ether; 30-crown-10; Benzo-30-crown-10; 4'-Vinylbenzo-30-crown-10 ether; Dibenzo-30-crown-10; and bis(m-phenylene)-32-crown-10; and wherein the second electrode is a Si-dominant electrode.

5. The method of claim 4, wherein the anode comprises a self-supporting composite material film.

6. The method of claim 4, wherein the Si-dominant electrode comprises:
greater than 0% and less than about 95% by weight of silicon particles, and
greater than 0% and less than about 90% by weight of one or more types of carbon phases,
wherein at least one of the one or more types of carbon phases is a substantially continuous phase that holds the Si-dominant electrode together such that the silicon particles are distributed throughout the Si-dominant electrode.

* * * * *